(12) United States Patent
Tanaka et al.

(10) Patent No.: US 6,947,634 B2
(45) Date of Patent: Sep. 20, 2005

(54) OPTICAL WAVEGUIDE DEVICE

(75) Inventors: Kazuo Tanaka, Gifu (JP); Masahiro Tanaka, Gifu (JP)

(73) Assignee: Gifu University, Gifu (JP)

( * ) Notice: Subject to any disclaimer, the term of this patent is extended or adjusted under 35 U.S.C. 154(b) by 100 days.

(21) Appl. No.: 10/627,944

(22) Filed: Jul. 25, 2003

(65) Prior Publication Data

US 2004/0062477 A1 Apr. 1, 2004

(30) Foreign Application Priority Data

Jul. 25, 2002 (JP) .................................. 2002-217084
Jan. 28, 2003 (JP) .................................. 2003-018997

(51) Int. Cl.[7] ............................................... G02B 6/42
(52) U.S. Cl. ........................... 385/31; 385/12; 385/39
(58) Field of Search ............................ 385/12, 31, 39, 385/129

(56) References Cited

U.S. PATENT DOCUMENTS 6,549,687 B1 * 4/2003 Kochergin et al. ............. 385/12

FOREIGN PATENT DOCUMENTS

| EP | 0 185 782 A1 | 7/1986 | ............ G02B/21/00 |
| JP | 2002-365195 | 12/2002 | ............ G01N/13/14 |
| JP | 2003-006912 | 1/2003 | ............ G11B/7/135 |
| WO | WO 01/48521 A1 | 7/2001 | ............ G02B/6/12 |
| WO | WO 02/10830 A2 | 7/2001 | ............ G02B/21/00 |
| WO | WO 03/001258 A1 | 1/2003 | ............ G02B/6/12 |

OTHER PUBLICATIONS

Johnson et al., "Optical constants of the Noble Metals", Phys. Rev. B. Solid State, American Institute of Physics 6:4370–4379, 1972, XP–001031007.

Schroter et al., "Surface Plasmon Polaritons on Metal Cyoindes with Dielectric Core", Physical Review B 64:125420-1–125420-10, 2001, XP002259671.

Berini, "Plasmon Polariton Modes Guided by a Metal Film of Finite Width", Optics Letters, 24:1011–1013, 1999, abstract hhtp://ol.osa.org/abstract.cfm?id=37362, 2004.

* cited by examiner

*Primary Examiner*—Phan T. H. Palmer
(74) *Attorney, Agent, or Firm*—Fish & Richardson P.C.

(57) ABSTRACT

An optical waveguide device increases the intensity of light transmitted through an optical waveguide for a reduced cost without expanding the area of the light. The optical waveguide device according to the present invention includes an optical waveguide and defining surfaces defining the optical waveguide. The defining surfaces are formed of plasmon activating medium. The defining surface include a pair of inner parts that face each other along a direction perpendicular to a light transmission direction. The distance between the inner parts is less than the half of the wavelength of the light transmitted through the optical waveguide.

14 Claims, 17 Drawing Sheets

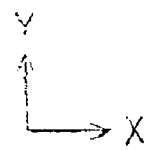
Fig.6(a)  Fig.6(b)  Fig.6(c)
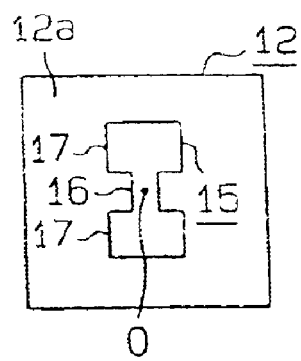 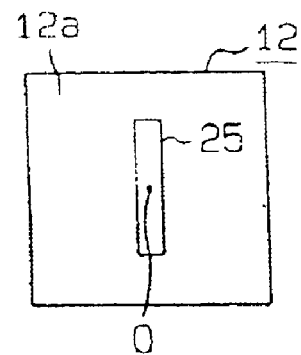 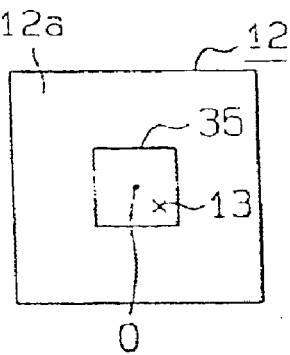
Fig.7
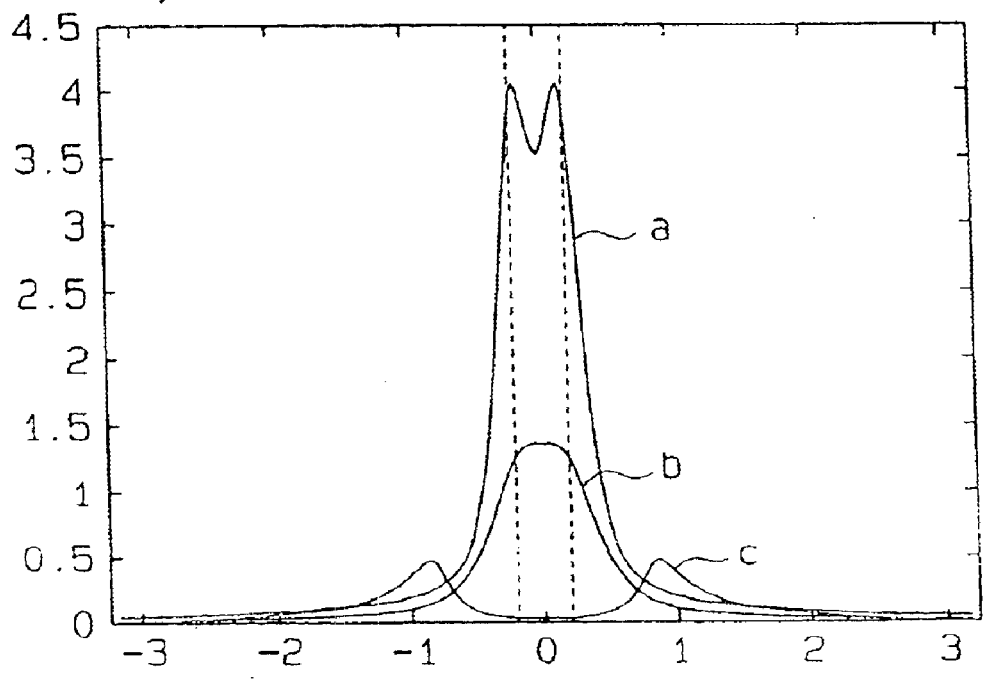

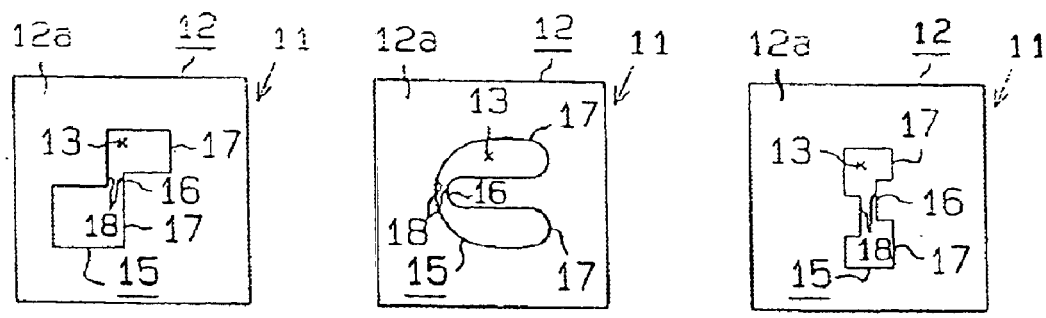
Fig.16(a)  Fig.16(b)  Fig.16(c)
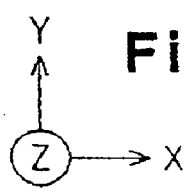
Fig.17(a)
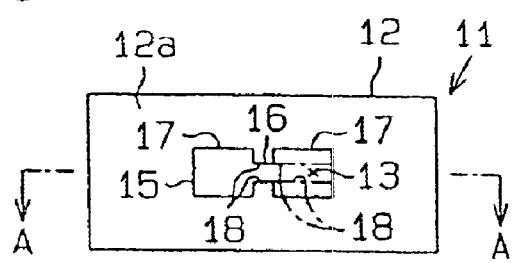
Fig.17(b)
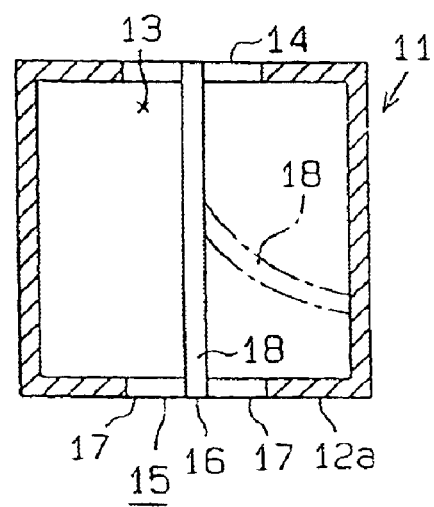

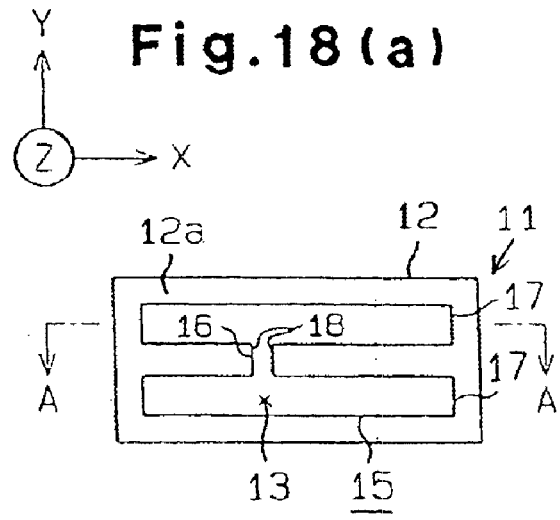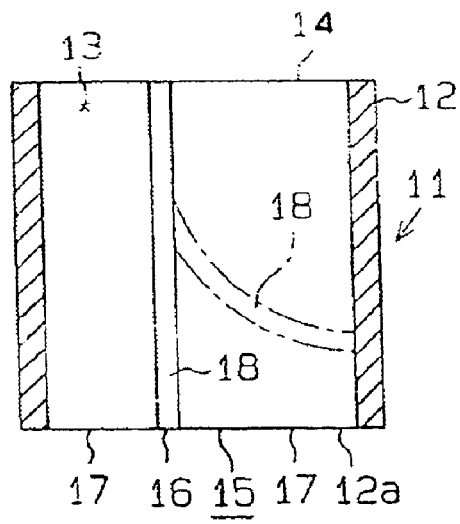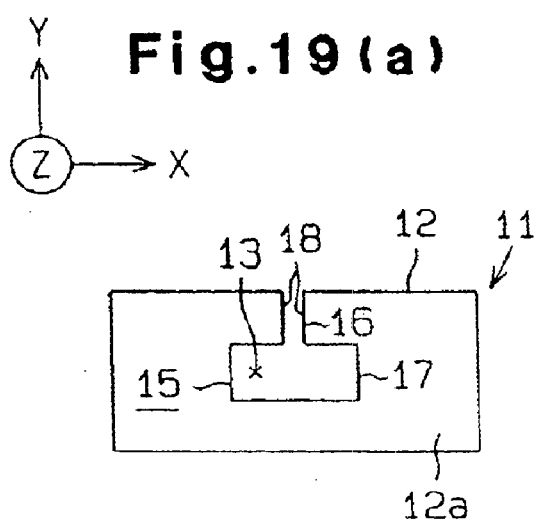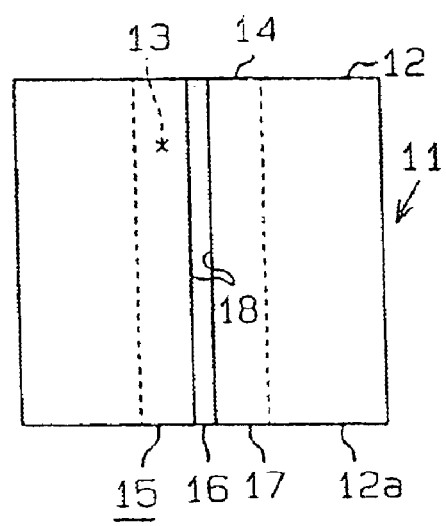

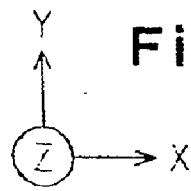
Fig.20(a)
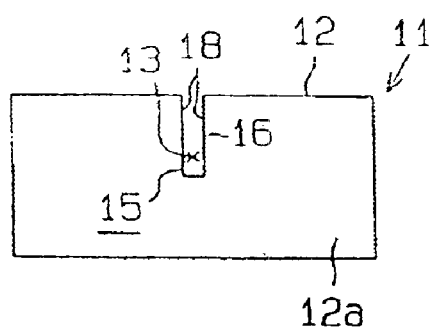
Fig.20(b)
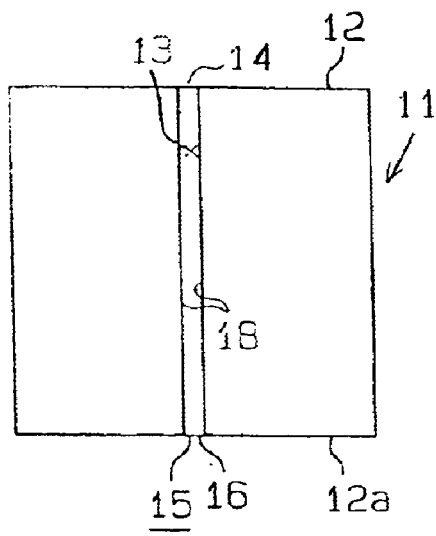
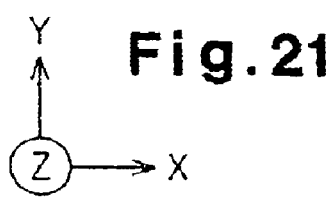
Fig.21(a)
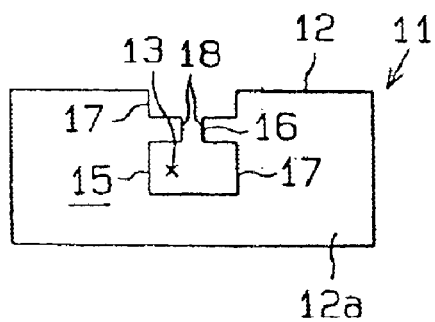
Fig.21(b)
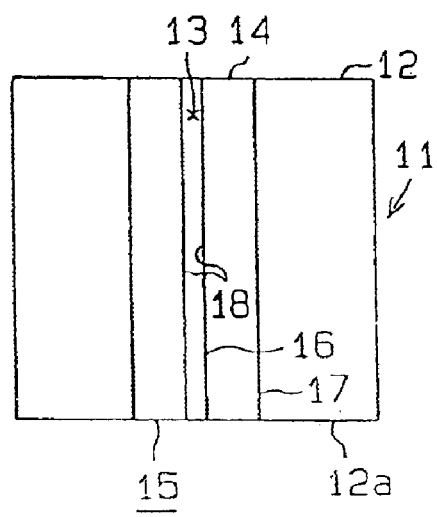

OPTICAL WAVEGUIDE DEVICE

BACKGROUND OF THE INVENTION

The present invention relates to an optical waveguide device suitable for scanning near-field optical microscopes and optical data recorders.

In recent years, a technology using near-field light (light that reaches regions of distances shorter than wavelengths of light) attracts a great deal of attention as a technology for enabling optical treatment of light in a regions smaller than the wavelength of light (visible light: 0.4 to 0.8 micrometers). For example, in the field of scanning near-field optical microscopes, an optical probe made of an optical fiber with a minute opening is used as an optical waveguide device. The size of the opening is less than wavelength of light. When observing a minute area on a surface of a sample, the minute opening of the optical probe is located close to the area so that the field of light (near field) emerging out of the opening contacts the surface of the sample. Then, the minute area of the sample, which is coupled to the near field, is irradiated with the near-field light. Reflected light, scattering light, and transmitted light from the sample are detected so that the area is locally observed and evaluated. Conventionally, various types of optical probes are used for decreased size of data pits of optical recording media such as CDs and for evaluating semiconductor manufacturing processes in which submicron machining is performed.

The size of the distal opening of an optical probe is less than the wavelength of light. Thus, for example in an illumination mode, the intensity of near-field light emerging out of the minute opening is as feeble as one thousandth of light introduced in the optical probe. Light of such optical probe is insufficient for high-speed writing or high-speed reading of optical data recording devices. It is therefore necessary to increase the intensity of near-field light emerging out of the minute opening of the optical probe. However, if a light source with a high intensity is used for increasing the intensity of near-field light, the costs are increased. On the other hand, if the size of the distal opening is increased, the light is spread in a wider area and the resolution is degraded. Neither case therefore cannot eliminates drawbacks in practical use.

SUMMARY OF THE INVENTION

Accordingly, it is an objective of the present invention to provide an optical waveguide device that increases the intensity of light transmitted through an optical waveguide for a reduced cost without expanding the area of the light.

To achieve the foregoing and other objectives and in accordance with the purpose of the present invention, an optical waveguide device includes an optical waveguide and defining surfaces. The optical waveguide transmits light having a predetermined wavelength along a first direction that is perpendicular to second and third directions. The second and third directions are perpendicular to each other. The defining surfaces define the optical waveguide. The defining surfaces include a pair facing parts that face each other along the second direction. The distance between the facing parts is less than the half of the wavelength of the light transmitted by the optical waveguide. Among the defining surfaces, at least the facing parts are made of plasmon activating medium.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6(a) is a front view showing the first embodiment;

FIG. 6(b) is a front view showing a comparison example 1;

FIG. 6(c) is a front view showing a comparison example 2;

FIG. 7 is graph showing light intensity distribution on an imaginary plane along an X axis of light that has passed through minute openings of FIGS. 6(a) to 6(c);

FIG. 16(a) is a front view illustrating a modification with a different shape of minute opening;

FIG. 16(b) is a front view illustrating a modification with a different shape of minute opening;

FIG. 16(c) is a front view illustrating a modification with a different shape of minute opening;

FIG. 17(a) is a front view illustrating another embodiment according to the present invention;

FIG. 17(b) is a cross-sectional view taken along line A—A in FIG. 17(a);

FIG. 18(a) is a front view illustrating another embodiment according to the present invention;

FIG. 18(b) is a cross-sectional view taken along line A—A in FIG. 18(a);

FIG. 19(a) is a front view illustrating another embodiment according to the present invention;

FIG. 19(b) is a plan view of FIG. 19(a);

FIG. 20(a) is a front view illustrating another embodiment according to the present invention;

FIG. 20(b) is a plan view of FIG. 20(a);

FIG. 21(a) is a front view illustrating another embodiment according to the present invention;

FIG. 21(b) is a plan view of FIG. 21(a);

DETAILED DESCRIPTION OF THE PREFERRED EMBODIMENTS

An optical waveguide device 11 according to a first embodiment will now be described with reference to FIGS. 1 to 8. In this embodiment, the optical waveguide device is an optical probe.

Figure 1:
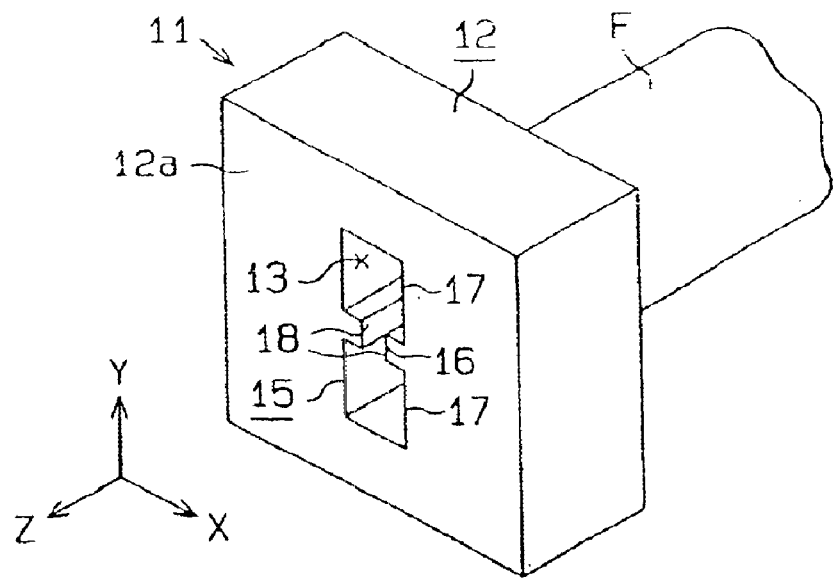
FIG. 1 is a perspective view illustrating an optical waveguide device, or an optical probe, according to a first embodiment connected to an optical fiber.

As shown in FIG. 1, the optical waveguide device (optical probe) 11 of this embodiment includes a main body 12, which is a rectangular metal plate. The main body 12 is made of a dielectric medium having a negative value for the real part of the relative complex permittivity. That is, the main body 12 is made of a negative dielectric medium (plasmon activating medium). In this embodiment, the wavelength of transmitted light is 488 nm, and the main body 12 is made of silver (Ag) in which the real part of the relative complex permittivity is minus 7.38. The relative complex permittivity of a dielectric medium is represented by the ratio of the permittivity of the dielectric medium to the permittivity in a vacuum.

Figure 3A:
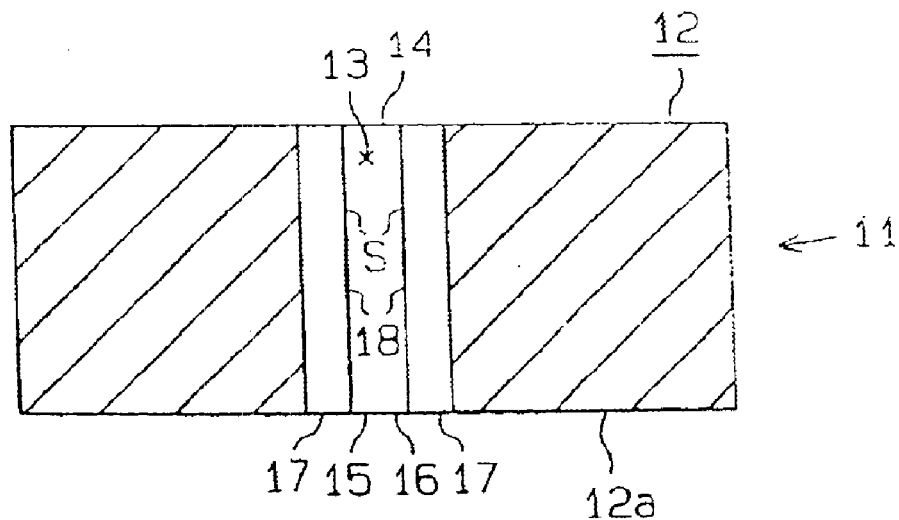
FIG. 3(a) is a cross-sectional view taken along line A—A in FIG. 2.
Figure 3B:
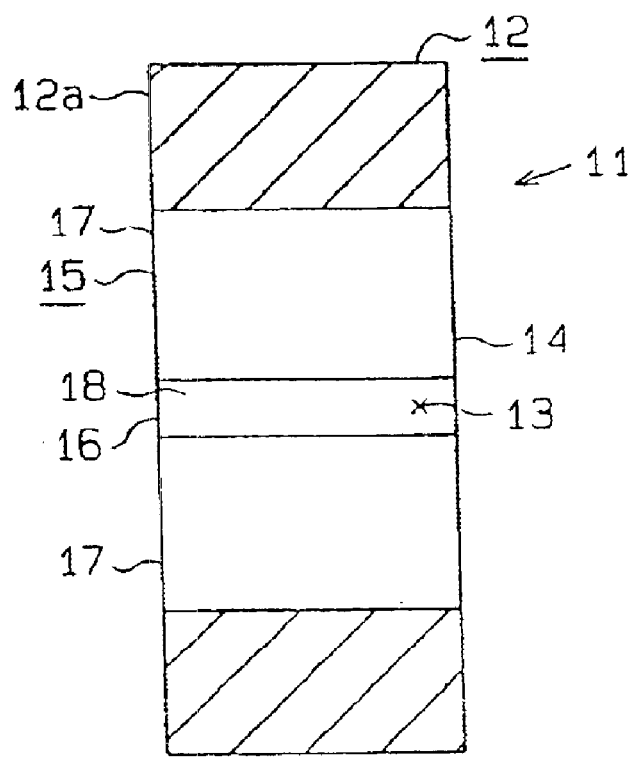
FIG. 3(b) is a cross-sectional view taken along line B—B in FIG. 2.

As shown in FIGS. 1, 3(a), and 3(b), an optical waveguide 13 for transmitting light is formed in the main body 12 through the thickness direction. Therefore, the inner surfaces of the main body 12 are defining surfaces for defining the optical waveguide 13. To the proximal opening of the optical waveguide 13, or to a back opening 14 of the waveguide 13, an optical fiber F is connected. The optical fiber F is also connected to a light source (not shown) and permits the light of the light source to enter the optical waveguide 13. The optical fiber F has a conventional light confining structure and has a core of a high index of refraction and a clad of a low index of refraction. The distal end of the cove is connected to the back opening 14 of the optical waveguide 13 to transmit light. The thickness of the main body 12 is preferably equal to or more than one twentieth of, and more preferably equal to or more than one quarter of the wavelength of light transmitted through the optical waveguide 13 so that surface plasmon is produced on the inner surface of the optical waveguide 13.

A minute opening 15 is formed in a front portion 12a of the main body 12. The width of the minute opening 15 is less than the waveguide of light. The minute opening 15 functions as a distal opening (end opening) of the optical waveguide 13. A cross-section of the optical waveguide 13 perpendicular to the direction along which light is transmitted through the optical waveguide 13 (a Z direction as viewed in FIGS. 1 and 2) is formed as follows.

Figure 2:
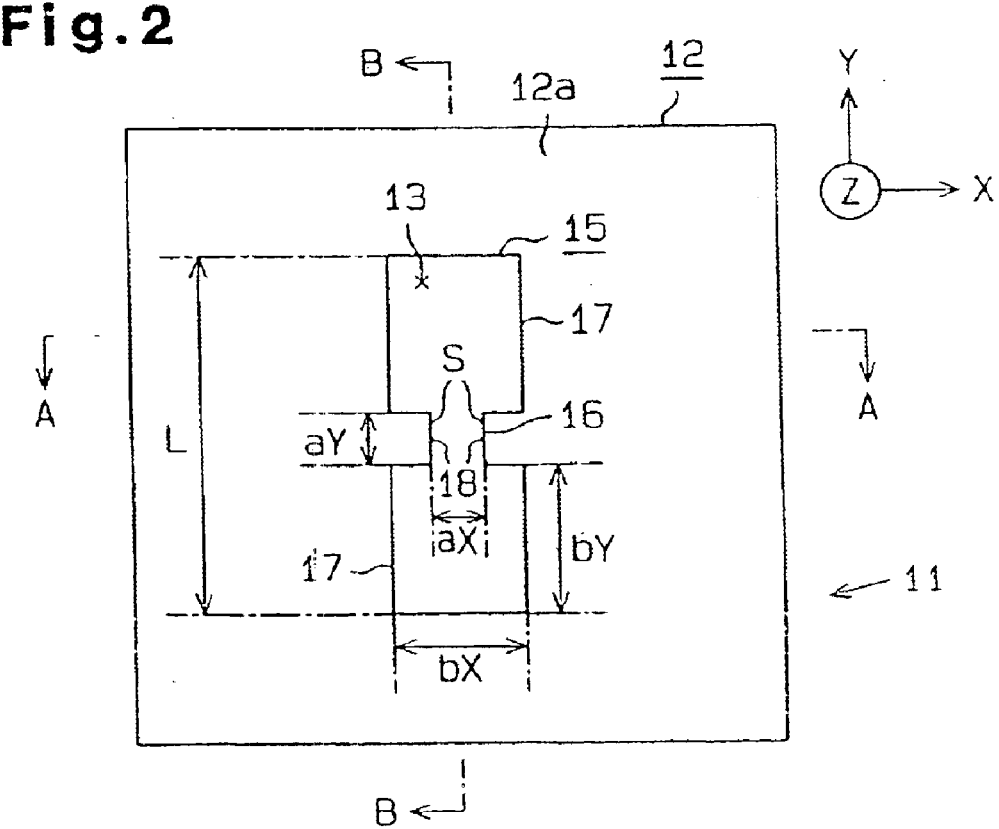
FIG. 2 is a front view illustrating the optical waveguide device shown in FIG. 1.

As shown in FIGS. 1 and 2, the minute opening 15 has a narrow section 16 and a pair of wide sections 17. The narrow section 16 is substantially located in a center of the front portion 12a. The wide sections 17 are located above and below the narrow section 16 as viewed in FIG. 1. The width of each of the narrow section 16 and the wide sections 17 is defined as the measurement along the polarization direction of light transmitted through the optical waveguide 13, or the measurement along an X direction as viewed in FIGS. 1 and 2. The narrow section 16 and the wide sections 17 are continuously formed along a direction perpendicular to the width direction, or along a Y direction as viewed in FIGS. 1 and 2. The defining surfaces include a pair of surfaces (inner parts 18) that function as first facing parts and two pairs of surfaces that function as second facing parts. The first facing parts face each other along the X direction in the narrow section 16. The second facing parts face each other along the X direction in each of the wide sections 17. Although the actual size of the minute opening 15 is significantly small compared to the size of the main body 12 (and the front portion 12a), the size of the minute opening 15 is exaggerated in FIG. 1 and other drawings, so that the unique shape of the minute opening 15 is easily recognized.

The width aX of the narrow section 16 (see FIG. 2) is less than the wavelength of transmitted light (in this embodiment, 488 nm). In this embodiment, the width aX is less than the half of the wavelength (for example 31 nm). The width aX is determined such that, when light wave (electromagnetic wave), or surface plasmons, is generated on the inner surface of the optical waveguide 13 (particularly, parts 18 facing each other at the narrow section 16), the electromagnetic field is intensified, and the phase velocity is decreased. Accordingly, light converges to the narrow section 16. Surface plasmon is commonly referred to as surface plasmon polariton. However, in this embodiment, it is simply referred to as surface plasmon.

In this embodiment, a measurement L of the minute opening 15 (see FIG. 2) in a direction along which the narrow section 16 and the wide sections 17 are continuously formed (the Y direction as viewed in FIGS. 1 and 2) is 217 nm. The measurement L is more than a measurement calculation value. The measurement calculation value is obtained in the following manner. First, the phase velocity of surface plasmons generated in the narrow section 16 is divided by the velocity of the transmitted light through a vacuum. Then, the division result is multiplied by the half of the wavelength of the transmitted light. The resultant is used as the measurement calculation value. The measurement L is determined in the above manner because, in a case where the width aX of the narrow section 16 is less than the half of the wavelength of transmitted light, the transmitted light cannot pass through the minute opening 15 if the measurement L is less than the measurement calculation value. Other measurements (see FIG. 2) of the minute opening 15 do not have any specific relationships with the wavelength of transmitted light. In this embodiment, the length ay of the narrow section 16 is equal to the width aX, which is 31 nm. The width bX of each wide section 17 is 78 nm. The length bY of each wide section 17 is 93 nm.

As shown in FIGS. 3(a) and 3(b), a cross-section of the optical waveguide 13 perpendicular to the direction of light transmittance is the same as the shape of the minute opening 15 at any section. Therefore, the entire inner surface of the optical waveguide 13, including the parts 18, is formed of silver (Ag). Also, in the entire inner surface of the optical waveguide 13, the narrow section 16 is formed continuously from the minute opening 15 to the back opening 14.

An operation of the optical waveguide device 11 of this embodiment will now be described. In the following description, an illumination mode will be described. In the illumination mode, a predetermined light enters the optical waveguide 13 of the device 11 through the back opening 14, and a spotlight emerges out of the minute opening 15, which is a distal opening. The wavelength of the predetermined light is 488 nm. The predetermined light is a plane wave of linear polarization, and its polarization direction is the X direction as viewed in FIGS. 1 and 2.

When the predetermined light enters the optical waveguide 13 of the main body 12, the phenomenon described below takes place. The main body 12, which has the optical waveguide 13, is constructed such that the real part of the relative complex permittivity is minus 7.38 when the wavelength of transmitted light is 48.8 nm. That is, the main body 12 is made of a negative dielectric medium. Therefore, in a light wave region, the main body 12 acts as a plasmon activating medium rather than as a conductor. Therefore, on the inner surface of the optical waveguide 13, vibration of electric charge occurs as surface charge is induced. Accordingly, light wave (electromagnetic wave), or surface plasmons, is generated. The surface plasmons are transmitted along the inner surface of the waveguide 13 (along the Z direction in FIG. 2).

The surface plasmon is a wave that is not transmitted in a direction perpendicular to interfaces S (see FIG. 4) between the inner surface of the optical waveguide 13 and air (dielectric) filling the waveguide 13. Therefore, when the surface plasmons are generated, a magnetic filed that is parallel to the interfaces S is generated. The generated magnetic field mainly has components along the Y direction of FIGS. 1 and 2 in the narrow section 16. At the same time, an electric filed perpendicular to the interfaces S is generated. The generated electric filed is perpendicular to the magnetic field and has components along the X direction of FIGS. 1 and 2.

Figure 4:
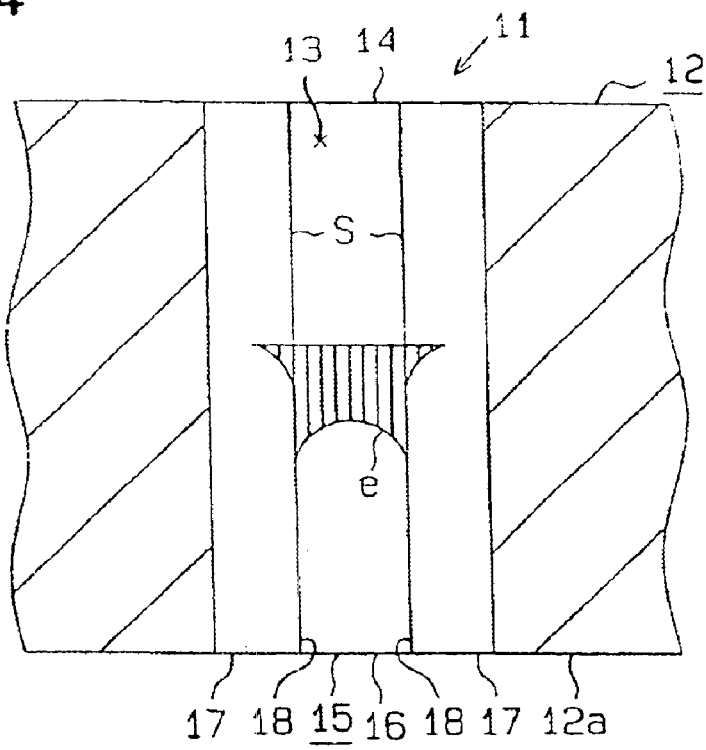
FIG. 4 is a cross-sectional view for explaining electric field coupling of surface plasmons.

In general, the field intensity of surface plasmon in a dielectric medium whose real part of the relative complex permittivity is negative attenuates exponentially as the distance from the surface (the interfaces S) is increased. However, in this embodiment, the measurement aX of the narrow section 16, or the distance between the facing parts 18, is set to a minute value, or 31 nm. Therefore, as shown in FIG. 4, at the narrow section 16, electric fields of surface plasmons generated in the facing interfaces S are coupled to each other. The coupling of the electric fields significantly increase the field intensity of the surface plasmons at the narrow section 16. This indicates that a phenomenon similar to surface plasmon enhanced Raman scattering is taking place at the narrow section 16. As a result, the intensity of light transmitted through the optical waveguide 13 is increased particularly at a part where coupling of surface plasmons is taking place, which part includes the narrow section 16. In FIG. 4, e represents the distribution of the electric field.

Figure 5:
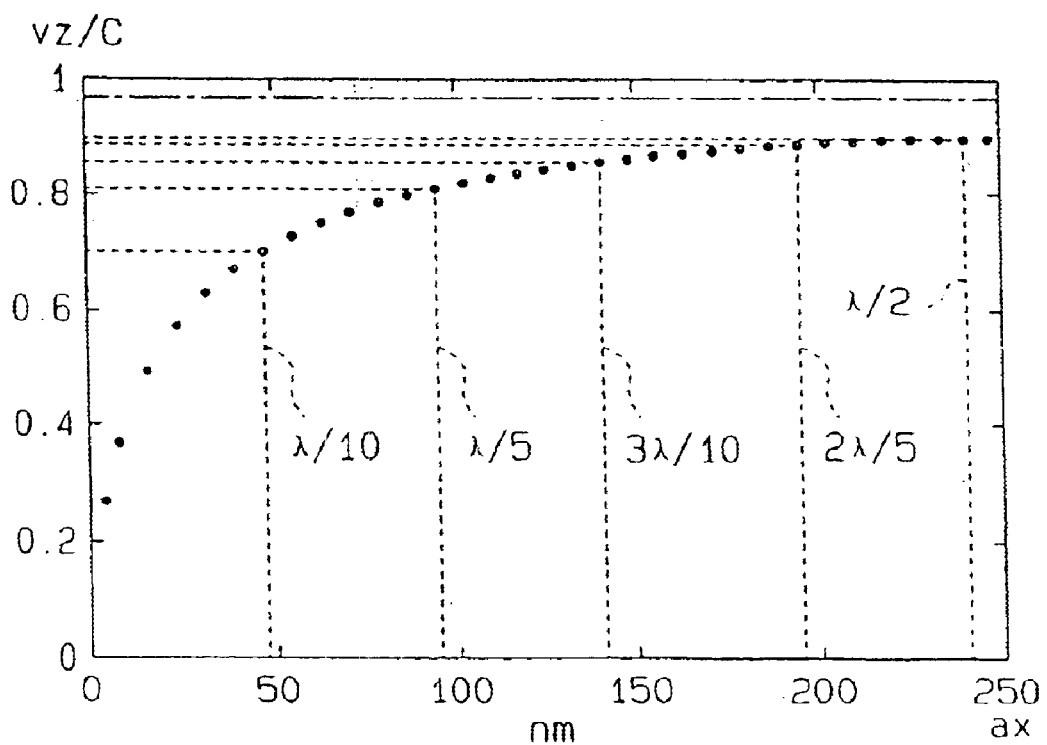
FIG. 5 is a graph showing the relationship between the width of a narrow portion and the phase velocity of surface plasmons.

For example, to increase the resolution of a scanning near-field optical microscopes or to increase the recording density of an optical data recorder, divergence distribution of light emitted from the minute opening 15, which is the distal opening of the optical waveguide 13, needs to be decreased. FIG. 5 shows the relationship between the phase velocity of the surface plasmons in the Z direction of FIGS. 1 and 2 and the width aX of the narrow section 16 in the optical waveguide 13.

In FIG. 5, the horizontal axis represents the width aX of the narrow section at the minute opening 15 of the optical waveguide 13, and the scales are in nanometers (nm). The vertical axis represents velocity ratio of the phase velocity vz of surface plasmons passing through the narrow section 16 to the light speed C (vz/C). The numbers on the scales of the vertical axis represent the values of the velocity ratio (vz/C) when light speed (C) is expressed by one. Therefore, a smaller value of the velocity ratio (vz/C) in the vertical axis represents a smaller velocity vz of the surface plasmons.

In FIG. 5, black spots represent the relationship between the width aX of the narrow section 16 and the phase velocity vz of the surface plasmons in a case where the entire inner surface of the optical waveguide 13 is formed with silver (Ag) in which the real part of the relative complex permittivity is minus 7.38 when the wavelength of transmitted light is 488 nm. A horizontal alternate long and short dash line is located slightly below the scale line of the value one. This horizontal line represents the value of the velocity ratio (vz/C) on the assumption that the width aX is infinite ($\infty$).

As obvious from FIG. 5, the velocity ratio (vz/C) decreases as the width aX of the narrow section 16 is decreased. When the width aX is less than $\lambda/2$ (aX<$\lambda/2$, or aX<244 nm), the degree of decrease of the velocity ratio (vz/C) is greater when the width aX is less than $2\lambda/5$ (aX<$2\lambda/5$, or aX<195.2 nm) than when the width aX is equal to or more than $2\lambda/5$ (aX$\geq 2\lambda/5$, or aX$\geq$195.2 nm) Similarly, the degree of decrease of the velocity ratio (vz/C) is greater when the width aX is less than $3\lambda/10$ (aX<$3\lambda/10$, or aX<146.4 nm) than when the width aX is equal to or more than $3\lambda/10$ (aX$\geq 3\lambda/10$, or aX$\geq$146.4 nm).

Particularly, when the width aX is less than $\lambda/5$ (aX<$\lambda/5$, or aX<97.6 nm), the velocity ratio (vz/C) is acceleratingly decreased. When the width aX is less than λ/10 (aX<λ/5, or aX<48.8 nm), the velocity ratio (vz/C) is further acceleratingly decreased. When the width aX is more than the half of the wavelength of transmitted light (488 nm), the velocity ratio (vz/C) approaches the value represented by the horizontal alternate long and short dash line, or the value of the velocity ratio (vz/C) on the assumption that the width aX is infinite (aX=∞).

As obvious from above, the phase velocity of surface plasmons generated at the inner surface of the optical waveguide 13 is significantly decreased at a part where the width aX is less than the half of the wavelength of transmitted light, or a part where the width is less than 244 nm (aX<244 nm). In this embodiment, the phase velocity is significantly decreased at the narrow section 16. Light wave like surface plasmon has the property of converging to a space where the phase velocity vz is small. Thus, surface plasmons generated at the entire inner surface of the optical waveguide 13 including the narrow section 16 and the wide sections 17 are converged to the narrow section 16, where the width aX is less than the half of transmitted light (aX<244 nm) so that the phase velocity vz is decreased.

Accordingly, without increasing the intensity of the light source, the electric field intensity of surface plasmons is increased at the narrow section 16. Thus, the phase velocity vz is decreased and surface plasmons generated in the optical waveguide 13 converge, which increases the intensity of light transmitted through the optical waveguide 13. Then, the light with the increased intensity emerged out of the narrow section 16 of the minute opening 15 as a spotlight (near-field light) and is scattered on the sample surface. The scattered light is detected by a photodetector (not shown) having an external lens.

Comparison examples 1 and 2 each having minute openings of shapes different from the minute opening 15 were prepared. The intensity of light passing through the minute openings was examined. FIG. 6(a) is a front view showing the minute opening 15 of this embodiment. FIG. 6(b) is a front view showing a minute opening 25 of the comparison example 1, which is also another embodiment of the present invention. FIG. 6(c) is a front view showing a minute opening 35 of the comparison example 2. As shown in FIG. 6(b), the minute opening 25 of the comparison example 1 is formed rectangular, and its longitudinal measurement and lateral measurement are the same as the measurement L and the width aX at the narrow section 16 of the minute opening 15. As shown in FIG. 6(c), the minute opening 35 of the comparison example 2 is square, and the length of each side is greater than the width bX at each wide section 17 of the minute opening 15 of this embodiment.

Figure 8:
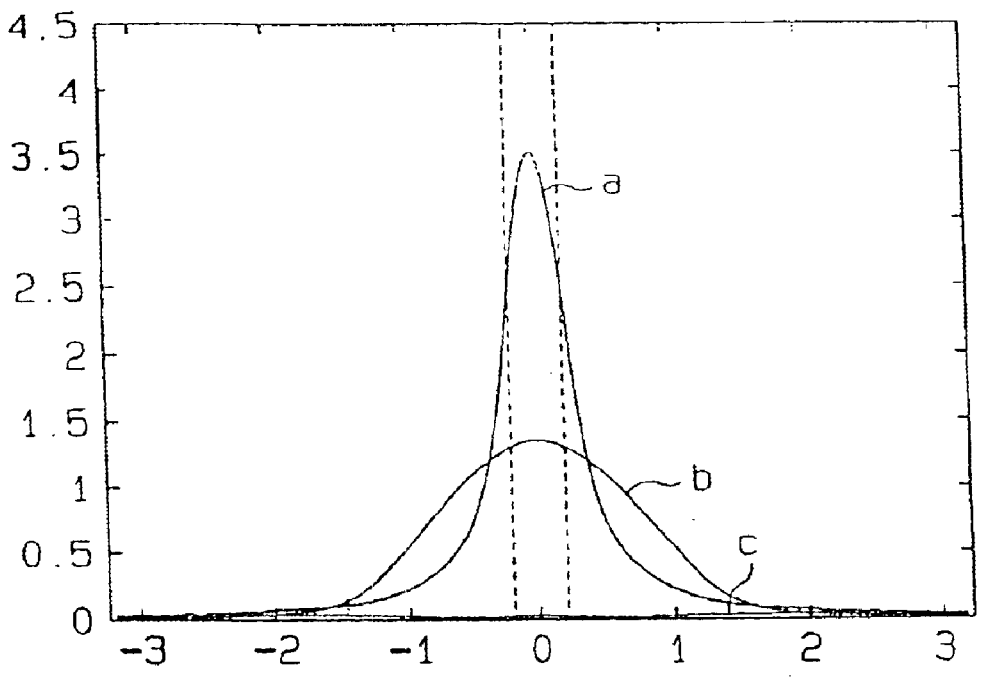
FIG. 8 is graph showing light intensity distribution on an imaginary plane along an Y axis of light that has passed through minute openings of FIGS. 6(a) to 6(c)

The intensity of light in an imaginary plane containing the center O of each minute opening 15, 25, 35 were examined under the same conditions. FIG. 7 shows the intensity distribution of light along an imaginary lateral plane (along the X direction of FIGS. 6(a) to 6(b)) containing the center O of each minute opening 25, 15, 35. FIG. 8 shows the intensity distribution of light along an imaginary vertical plane (along the Y direction of FIGS. 6(a) to 6(b)) containing the center O of each minute opening 25, 15, 35. In FIGS. 7 and 8, curves a represent the intensity distribution of light that has passed through the minute opening 15 of this embodiment, curves b represent the intensity distribution of light that has passed through the minute opening 25 of the comparison example 1, and curves c represent the intensity distribution of light that has passed through the minute opening 35 of the comparison example 2.

As shown by the curves a in FIGS. 7 and 8, the light intensity is significantly increased in the vicinity of the center O. One of the reasons of this is that surface plasmons are coupled to each other at the facing interfaces S in the narrow section 16 and enhances the electromagnetic intensity. Another reason is that the phase velocity of surface plasmons is decreased the surface of the narrow section 16, and light transmitted through the optical waveguide 13 converges to the narrow section 16.

Next, the case of the minute opening 25 of the comparison example 1 is examined. As shown by the curves b, the maximum value of the light intensity distribution is at the center O of the minute opening 25. One of the reasons for this is considered that surface plasmons at the facing interfaces are coupled to each other. Compared to the case of the minute opening 15 of this embodiment expressed by curves a, the electric field intensity is low in the comparison example 1. This is because the shape of the opening 25 is rectangular having the constant width along the longitudinal direction. In other words, the minute opening 25 does not have the narrow section 16 and the wide sections 17, which are continuously formed.

Therefore, compared to the minute opening 15 of this embodiment, the opening 25 of the comparison example 1 is less effective in decreasing the phase velocity of the surface plasmon to converge transmitted light. However, the minute opening 25 is as effective as the minute opening 15 in causing surface plasmons generated at the interfaces to be coupled to each other, thereby increasing the electric field intensity. Accordingly, the comparison example 1 has the same technical ideas as this embodiment and can be regarded as a modification of the embodiment.

In the case of the minute opening 35 of the comparison example 2, the light intensity is slightly increased as shown by the curves c at the left and right interfaces where surface plasmons are generated. However, the light intensity is scarcely increased at the center O of the minute opening 35. That is, in the case of minute opening 35 of the comparison example 2, the electric field intensity is not increased by coupling of surface plasmons generated at the interfaces. Therefore, the minute opening 35 does not decrease the phase velocity of surface plasmons to converge transmitted light, is therefore not suitable for practical use.

The optical waveguide device according to this embodiment has the following advantages.

(1) The main body 12 has the optical waveguide 13 and is made of silver, which is a plasmon activating medium. Therefore, when light enters the optical waveguide 13, surface plasmons are generated on the inner surface of the optical waveguide 13 (including the minute opening 15). The width aX of the narrow section 16 of the optical waveguide 13 (the minute opening 15) is 31 nm, which is less than the half of the wavelength of light. Therefore, surface plasmons generated at the facing interfaces S of the narrow section 16 are coupled to each other and increase the electric field intensity. Further, since the phase velocity of the surface plasmons are decreased at the narrow section 16, light in the optical waveguide 13 converges to the narrow section 16. Accordingly, the narrow section 16 increases the intensity of a spotlight (near-field light) emerging out of the minute opening 15 (the distal opening of the optical waveguide 13). In other words, the intensity of the spotlight is increased at a low cost without increasing the intensity of the light source or expanding the divergence of light.

(2) The measurement L of the optical waveguide 13 (the minute opening 15) along a direction in which the narrow section 16 and the wide sections 17 are continuously formed is greater than the predetermined measurement calculation value. The measurement calculation value is obtained in the following manner. First, the phase velocity vz of surface plasmons generated in the narrow section 16 is divided by the light speed C (the velocity of the transmitted light through a vacuum). Then, the division result is multiplied by the half of the wavelength of the transmitted light. The resultant is used as the measurement calculation value. Therefore, light that enters the optical waveguide 13 from the optical fiber F is not blocked, and is guided out of the minute opening 15 as a spotlight (near-field light) with an increased intensity.

(3) Not only the part adjacent to the minute opening 15, but also the entire inner surface of the optical waveguide 13 is formed of silver (Ag), which is a plasmon activating medium. Therefore, surface plasmons are generated on the entire inner surface of the optical waveguide 13. Further, the narrow section 16 is continuously formed from the minute opening 15, or the distal opening, to the back opening 14. Therefore, surface plasmons generated at the facing interfaces S are coupled to each other along the entire inner surface of the optical waveguide 13 so that the electric field intensity is increased. Also, light is converged at the narrow section 16 along the entire inner surface of the optical waveguide 13 by decreasing the phase velocity of light.

(4) Silver (Ag), which is a dielectric medium whose real part of the relative complex permittivity is negative, is used as the plasmon activating medium. Thus, surface plasmons are effectively and reliably generated. The optical waveguide device 11 is easily manufactured by simply forming the optical waveguide 13 in the main body (metal plate) 12, which is made of the plasmon activating medium (Ag).

(5) The minute opening 15 formed at the distal end of the optical waveguide 13 has the narrow section 16, and the width aX of the narrow section 16 is less than the half of transmitted light. The inner surface of the optical waveguide 13, which is connected to the narrow section 16, is formed of a plasmon activation medium. Therefore, the optical waveguide device 11 is favorably used as an optical probe in various types of optical processing apparatuses such as scanning near-field optical microscopes and optical data recorders.

An optical waveguide device 11A according to a second embodiment will now be described with reference to FIGS. 9 to 11(b). In this embodiment, the optical waveguide device 11A is an optical probe. The second embodiment is the same as the first embodiment except for the shape of the front portion 12a of the main body 12, and the measurements of the minute opening 15 (for example, the width aX of the narrow section 16). Accordingly, differences from the first embodiment will mainly be discussed below, and like or the same reference numerals are given to those components that are like or the same as the corresponding components of the first embodiment.

Figure 9:
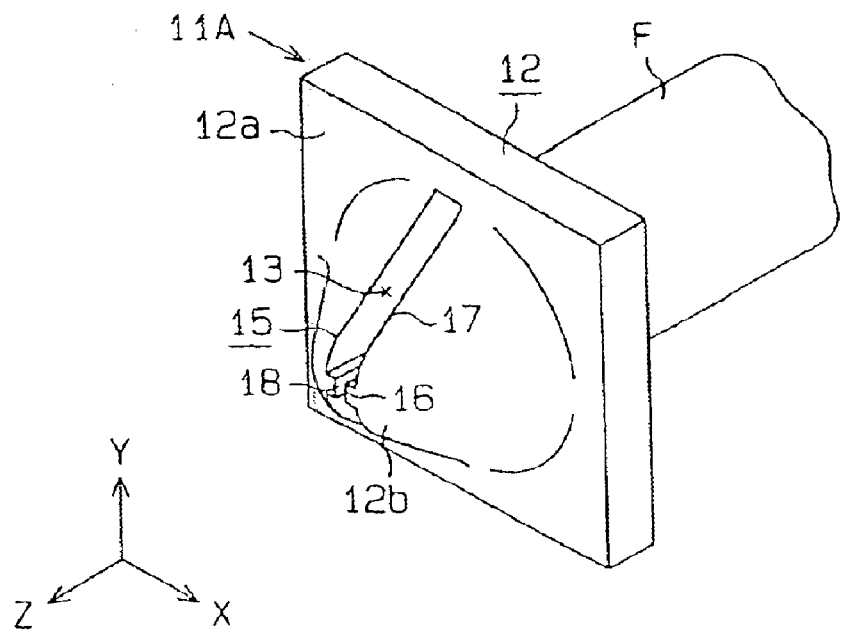
FIG. 9 is a perspective view illustrating an optical probe according to a second embodiment connected to an optical fiber.
Figure 10:
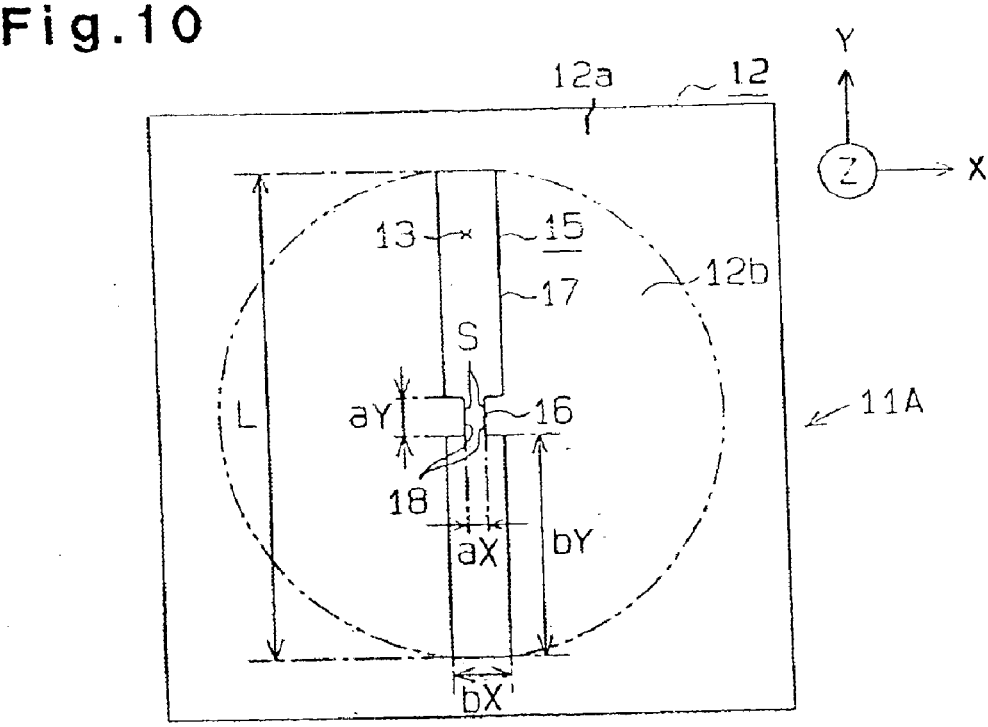
FIG. 10 is a front view illustrating the optical waveguide device shown in FIG. 1.

As shown in FIGS. 9 and 10, the optical waveguide device (optical probe) 11A of the second embodiment includes a main body 12. As in the first embodiment, the main body 12 is a plate made of silver. A projection 12b, which is a cone or a pyramid, is formed on the front portion of the main body 12. In this embodiment, the projection 12b is a smooth cone. The projection 12b is located substantially at the center of the front portion 12a. An optical waveguide 13 is formed in the main body 12. The optical waveguide 13 corresponds to the projection 12b. A minute opening 15 is formed in the projection 12b of the front portion 12a. When viewed from front, the minute opening 15 divides the projections 12b into the halves. The width of the minute opening 15 is less than the wavelength of light. The minute opening 15 functions as an end opening (distal opening) of the optical waveguide 13.

As shown in FIGS. 1 and 2, the minute opening 15 has a narrow section 16 and a pair of wide sections 17, which are formed alternately and continuously. The narrow section 16 is substantially located at a center of the front portion 12a. The wide sections 17 each extend from the peak to the foot of the projection 12b. The width of the wide sections 17 is wider than that of the narrow section 16. As in the first embodiment, the width of each of the narrow section 16 and the wide sections 17 is defined as the measurement along the polarization direction of light transmitted-through the optical waveguide 13, or the measurement along an X direction as viewed in FIGS. 9 and 10. The narrow section 16 and the wide sections 17 are continuously formed along a direction perpendicular to the width direction, or along a Y direction as viewed in FIGS. 9 and 10.

In the first embodiment, the minute opening 15 lies along a plane perpendicular to the direction along which light is transmitted through the optical waveguide 13. In the second embodiment, the minute opening 15 lies along a curved plane projecting in the direction along which light is transmitted through the optical waveguide 13, or in the Z direction as viewed in FIGS. 9 and 10. Specifically, minute opening 15 lies along a curved plane that corresponds to a cross-section of the conical projection 12b taken along a plane of the Y and Z axes in FIGS. 9 and 10. Although the actual size of the minute opening 15 is significantly small compared to the size of the main body 12 (and the front portion 12a), the size of the minute opening 15 is exaggerated in FIG. 9 and other drawings, so that the unique shape of the minute opening 15 is easily recognized.

The width aX (see FIG. 10) of the narrow section 16 of the minute opening 15 according the second embodiment is less than the width aX (31 nm) of the narrow section 16 of the first embodiment. For example, the width aX of the narrow section 16 is 16 nm in the second embodiment. The width bX (see FIG. 10) of the wide sections 17 according the second embodiment is less than the width bX (78 nm) of the wide sections 47 of the first embodiment. For example, the width bX of the wide sections 17 is 48 nm in the second embodiment. The length ay (see FIG. 10) of the narrow section 16 is the same as the length ay (31 nm) of the narrow section 16. The length bY of each wide section 17 is greater than the length bY (93 nm) of each wide section 17 of the first embodiment. For example, the length bY of each wide section 17 is 402 in the second embodiment. The thickness of the plate portion of the main body 12 is 78 nm. The height of the projection 12b projecting from the front portion 12a is 202 nm. Therefore, the measurement L (see FIG. 10) of the minute opening 15 of the second embodiment is 835 nm. The measurement L is the diameter of the projection 12b.

An operation of the optical waveguide device 11A of this embodiment will now be described.

As in the first embodiment, a predetermined light the wavelength of which is 488 nm is used. The predetermined light is a plane wave of linear polarization, and its polarization direction is the X direction as viewed in FIGS. 9 and 10. When the predetermined light enters the optical waveguide 13 of the main body 12 through the optical fiber F, the phenomenon described below takes place. That is, surface plasmons (electromagnetic wave) are generated. The transmission direction of the generated surface plasmon is a direction along the inner surface of the optical waveguide 13 (along the Z direction in FIG. 9). The electric fields of surface plasmons generated at the interfaces S are coupled to each other. As a result, the electric field intensity at the narrow section 16 of the optical waveguide 13 is increased. Surface plasmon generated at the entire inner surface of the optical waveguide 13 including the narrow section 16 and the wide sections 17 is converged to the narrow section 16, at which the phase velocity vz is decreased. Therefore, as in the first embodiment, the intensity of light transmitted through the optical waveguide 13 is increased at the narrow section 16. The transmitted light with the increased intensity emerges out of the narrow section 16 of the minute opening 15 as a spotlight (near-field light).

Figure 11A:
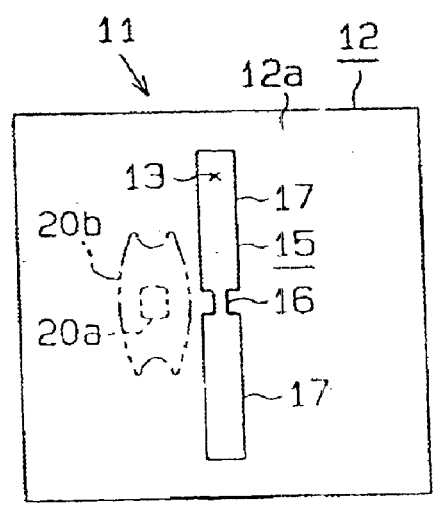
FIG. 11(a) is a front view showing a comparison example.
Figure 11B:
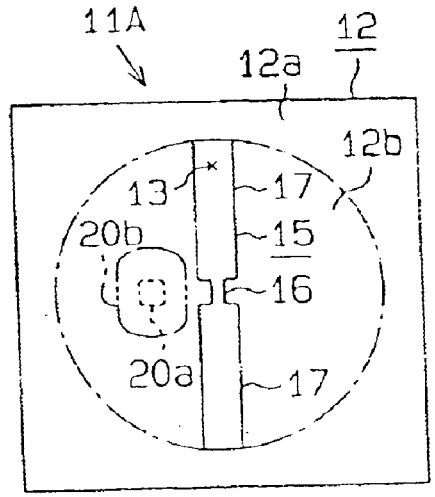
FIG. 11(b) is a front view showing the second embodiment.

In the second embodiment, the divergence of the spotlight (near-field light) emerging out of the minute opening 15 is further less than that of the first embodiment. This point will be discussed below. As in the first embodiment, FIG. 11(a) is a front view of an optical waveguide device 11 that has a main body 12 with a flat front portion 12a. A minute opening (distal opening) 15 of an optical waveguide 13 is formed in the front portion 12a. FIG. 11(b) is a front view showing the optical waveguide device 11A according to the second embodiment. The conical projection 12b is formed on the front portion 12a of the main body 12. The minute opening (distal opening) 15 of the optical waveguide 13 is formed in the projection 12b. To the left of each minute opening 15, a bright zone 20a is shown by broken lines in FIGS. 11(a) and 11(b). Each bright zone 20a represents the distribution of the spotlight emerging out of the narrow section 16 of each minute opening 15. Likewise, peripheral light about each bright zone 20a is shown by two-dot chain lines. The regions shown by two-dot chain lines are referred to as twilight zones 20b.

As obvious from the comparison between the FIGS. 11(a) and 11(b), the size of the bright zone 20a of the spotlight emerging out of each minute opening 15 is smaller in the optical waveguide device 11A of the second embodiment shown in FIG. 11(b) than in the optical waveguide device 11 shown in FIG. 11(a). Likewise, the size of the twilight zone 20b of the peripheral light about the spotlight is slightly extended in the longitudinal direction of the minute opening in the optical waveguide device 11 shown in FIG. 11(a), whereas the twilight zone 20b is relatively small and similar to the bright zone 20a in the optical waveguide device 11A according to the second embodiment shown in FIG. 11(b). In this manner, the divergence of light emerging out of the minute opening 15 of the optical waveguide device 11A according to the second embodiment is relatively small. That is, the bright zone 20a of the spotlight with an increased intensity and the twilight zone 20b about the bright zone 20a are both small. This is favorable for increasing a resolution and a data recording density in optical processing.

The reasons for this are considered to be as follows. The electric fields of surface plasmons generated on the inner surface of the optical waveguide 13 are coupled to each other prominently at the interfaces S of the narrow sections. Further, in other regions between the interfaces (for example, regions between the interfaces corresponding to each wide section 17), electric field coupling takes place and the electric filed intensity is increased although by a less degree than at the region between the interfaces S of the narrow section 16. Such surface plasmons converge to the narrow section 16, where the phase velocity vz is decreased. Thus, surface plasmons increases the intensity of transmitted light and causes the light to emerge out of the narrow section 16 as a spotlight. On the other hand, transmitted light emitted from the minute opening 15 (including the spotlight and peripheral light) is gradually attenuated away from the minute opening 15. At a certain distance from the minute opening 15, the transmitted light quenches.

In the second embodiment, the optical waveguide device 11A has the conical projection 12b, and the minute opening 15 is formed in the projection 12b. The minute opening 15 lies along a surface that is curved in the direction in which the transmitted light is emitted. In this structure, the light of the twilight zone 20b of the peripheral light grows weaker and quenches at the foot of the projection 12b due to attenuation after emission. In the bright zone 20a of the spotlight, the intensity of light is increased by surface plasmons converging from the entire inner surface of the optical waveguide 13 to the narrow section 16. However, from the foot of the projection 12b toward the peak, the inner surface length of each wide section 17 is decreased. Therefore, the zone in which light intensity is increased (that is, the bright zone 20a) is small.

Further, the phase velocity of light (surface plasmons) traveling along the inner surface of the optical waveguide 13 toward the minute opening 15 is less than the phase velocity when traveling in a space out of the minute opening 15, or through air. Thus, in the light transmission direction, reflection is expected to occur at the interface between minute opening 15, which is the outlet of the optical waveguide 13, and the outside air, due to the difference in indexes of refraction of the two media (silver and air). In general, light is apt be reflected as it reaches an interface with a greater angle (in an extreme case, the light is totally reflected). Thus, light (surface plasmons) that has traveled to the minute opening 15 along the inner surface of each wide section 17 located at the foot of the conical projection 12b is significantly reflected at the interface. The light is therefore scarcely emitted from the wide sections 17 of the minute opening 15. The reflected light is thereafter further reflected by the interfaces that is inclined relative to the light transmission direction and converge to the center of the minute opening 15, at which the narrow section 16 is formed, or to the distal end of the projection 12b). Therefore, as obvious from the comparison between FIGS. 11(a) and 11(b), in the optical waveguide device 11A having the conical projection 12b with the minute opening 15, the bright zone 20a and the twilight zone 20b are both minimized.

Accordingly, in addition to the advantages (1) to (5) of the optical waveguide device 11 of the first embodiment, the optical waveguide device 11A has the following advantages.

(6) In this embodiment, the divergence distribution of light emitted from the minute opening 15, which is the distal opening of the optical waveguide 13, is minimized. In other words, the bright zone 20a and the twilight zone 20b are both minimized. This realizes a higher resolution and a higher data recording density in optical processing.

(7) In this embodiment, the minute opening 15 of the optical waveguide 13 is formed not in the flat front portion 12a of the main body 12, but in the conical projection 12b. Transmitted light emerges out from the minute opening 15 at the narrow section 16 as a spotlight (near-field light). The narrow section 16 is located at the peak of the projection 12b. Therefore, for example, in fine optical processing using a scanning near-field optical microscope, the spotlight is easily irradiated onto a sample. The device 11 of the second embodiment is therefore practical.

An optical waveguide device 11B according to a third embodiment will now be described with reference to FIGS. 12 and 13(b). In this embodiment, the optical waveguide device 11B is an optical probe. The third embodiment is the same as the second embodiment except for the shape of the minute opening 15 formed in the projection 12b of the front portion 12a of the main body 12. Accordingly, differences from the first and second embodiments will mainly be discussed below, and like or the same reference numerals are given to those components that are like or the same as the corresponding components of the first and second embodiments.

Figure 12:
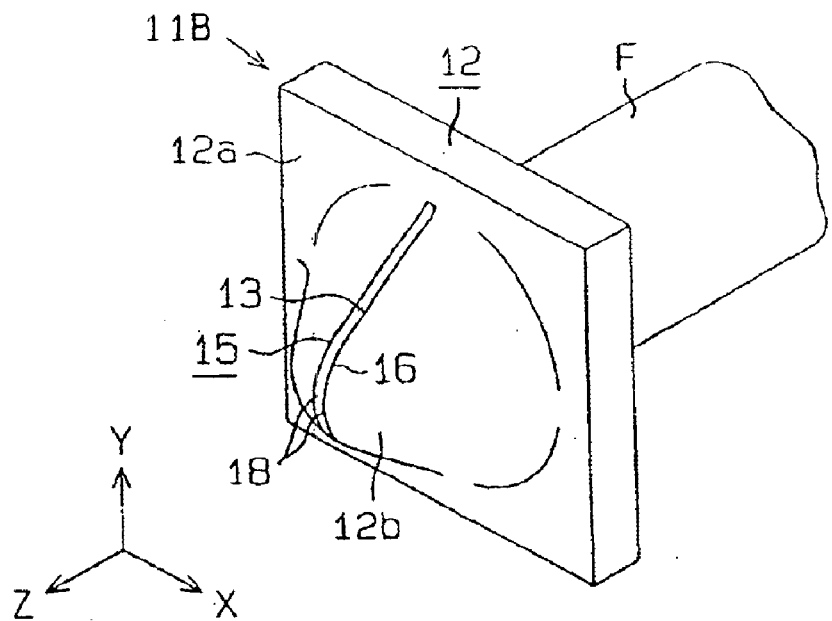
FIG. 12 is a perspective view illustrating an optical probe according to a third embodiment connected to an optical fiber.

As shown in FIG. 12, the optical waveguide device (optical probe) 11B of the third embodiment includes a main body 12. As in the second embodiment, the main body 12 is a plate made of silver. The conical projection 12b is formed on the front portion of the main body 12 as in the second embodiment. An optical waveguide 13 is formed in the main body 12. The optical waveguide 13 corresponds to the projection 12b. A minute opening 15 is formed in the projection 12b of the front portion 12a. When viewed from front, the minute opening 15 divides the projections 12b into the halves. The width of the minute opening 15 is less than the wavelength of light. The minute opening 15 functions as an end opening (distal opening) of the optical waveguide 13.

Unlike the minute opening 15 formed in the optical waveguide device 11A according to the second embodiment, the minute opening 15 of the optical waveguide device 11B according to the third embodiment does not have wide sections. That is, the minute opening 15 of the third embodiment is an extended rectangle having a constant width along the longitudinal direction. As in the second embodiment, the width of the minute opening 15 is defined as the measurement along the polarization direction of light transmitted through the optical waveguide 13, or the measurement along an X direction as viewed in FIG. 12. The minute opening 15 is formed as a rectangle extended along a direction perpendicular to the width direction, or along the Y direction as viewed in FIG. 12. As in the second embodiment, the minute opening 15 lies along a curved plane projecting in the direction along which light is transmitted through the optical waveguide 13, or in the Z direction as viewed in FIG. 12. Although the actual size of the minute opening 15 is significantly small compared to the size of the main body 12, the size of the minute opening 15 is exaggerated in FIGS. 12 to 13(b) for the same reasons presented above.

The width aX of the minute opening 15, or the width of the narrow section 16, is 16 nm, which is the same as the width aX of the narrow section 16 of the minute opening 15 according to the second embodiment. The length of the minute opening 15 (and the narrow section 16), or the longitudinal measurement of the minute opening, is 402 nm, which is the same as the measurement bY (see FIG. 10) of each wide section 17. That is, the diameter of the projection 12b is 402 nm. As in the second embodiment, the thickness of the plate portion of the main body 12 is 78 nm. The height of the projection 12b projecting from the front portion 12a is 202 nm.

As in the previous embodiments, a predetermined light the wavelength of which is 488 nm is used. The predetermined light is a plane wave of linear polarization, and its polarization direction is the X direction as viewed in FIG. 12. When the predetermined light enters the optical waveguide 13 of the main body 12 through the optical fiber F, the phenomenon described below takes place. That is, as in the previous embodiments, surface plasmons are generated on the inner surface of the optical waveguide 13. The electric fields of the surface plasmons are coupled to each other. As a result, the electric field intensity is increased. Therefore, due to the coupling of the electric fields, the intensity of light transmitted through the optical waveguide 13 is increased. The transmitted light with the increased intensity emerges out of the minute opening 15 (specifically, out of a region at the peak of the projection 12b) as a spotlight (near-field light).

Figure 13A:
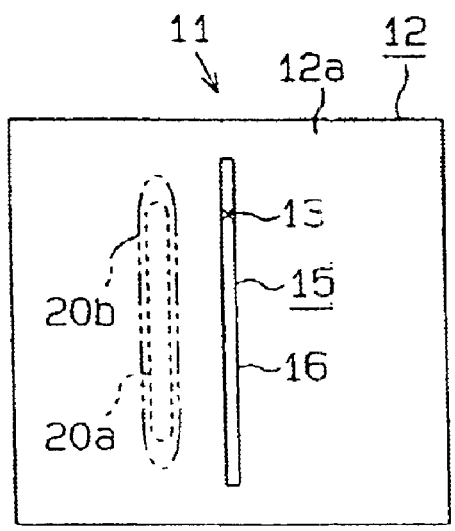
FIG. 13(a) is a front view showing a comparison example.

As in the second embodiment, the divergence of the spotlight (near-field light) emerging out of the minute opening 15 is further less than that of the first embodiment. This point will be discussed below. Like FIG. 6(b) showing the comparison example 1, FIG. 13(a) is a front view of an optical waveguide device 11 that has a main body 12 with a flat front portion 12a. A minute opening (distal opening) 15 of an optical waveguide 13 is formed in the front portion 12a. The minute opening 15 of FIG. 13(a) is shaped as an extended rectangle. FIG. 13(b) is a front view showing the optical waveguide device 11B according to the third embodiment. The conical projection 12b is formed on the front portion 12a of the main body 12. The minute opening (distal opening) 15 of the optical waveguide 13 is formed in the projection 12b. The minute opening 15 of FIG. 13(b) is shaped as an extended rectangle. As in FIGS. 11(a) and 11(b) of the second embodiment, a bright zone 20a of each spotlight and a twilight zone 20b of the peripheral light are is shown by broken lines and two-dot chain lines to the left of each minute opening 15 in FIGS. 13(a) and 13(b).

Figure 13B:
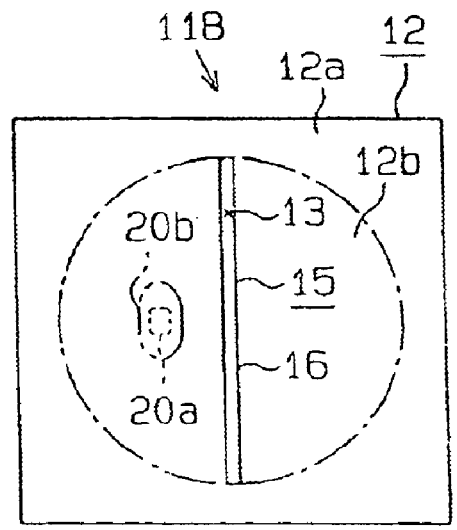
FIG. 13(b) is a front view showing the third embodiment.

As obvious from the comparison between the FIGS. 13(a) and 13(b), the size of the bright zone 20a of the spotlight emerging out of the minute opening 15 is substantially rectangular along the minute opening 15 in the optical waveguide device 11 in the optical waveguide device 11 shown in FIG. 13(a). In the optical waveguide device 11B of FIG. 13(b) according to the third embodiment, the size of the bright zone 20a is small as in the optical waveguide device 11A according to the second embodiment. Also, the twilight zone 20b of the optical waveguide device 11 shown in FIG. 13(a) is extended along the longitudinal direction of the minute opening 15. In the optical waveguide device 11B of FIG. 13(b) according to the third embodiment, the size of the twilight zone 20b is small, and the shape is similar to that of the bright zone 20a as in the optical waveguide device 11A according to the second embodiment.

In this manner, the divergence of light emerging out of the minute opening 15 of the optical waveguide device 11B according to the third embodiment is relatively small. That is, the bright zone 20a of the spotlight with an increased intensity and the twilight zone 20b about the bright zone 20a are both small. This is favorable for increasing a resolution and a data recording density in optical processing. This is because the minute opening 15 is formed not in the flat front portion 12a, but in the conical projection 12b. Detailed description of the operation has been given in the second embodiment and is omitted in this embodiment.

In addition to the advantages (1) to (5) of the optical waveguide device 11 according to the first embodiment, and the advantages (6) and (7) of the optical waveguide device 11A according to the second embodiment, the optical waveguide device 11B according to the third embodiment has the following advantage.

(8) In the third embodiment, when forming the optical waveguide 13 connected to the minute opening 15 in the main body 12, the narrow section 16 and wide sections having different widths need not be formed continuously. However, only the optical waveguide 13 having an extended rectangular cross-section perpendicular to the light transmission direction is formed. This reduces the manufacturing costs.

An optical waveguide device 11C according to a fourth embodiment will now be described with reference to FIG.

14. In this embodiment, the optical waveguide device 11C is an optical probe. The fourth embodiment is the same as the second embodiment except for the shape of a projection formed on the front portion 12a of the main body 12. Accordingly, differences from the first and second embodiments will mainly be discussed below, and like or the same reference numerals are given to those components that are like or the same as the corresponding components of the first and second embodiments.

Figure 14:
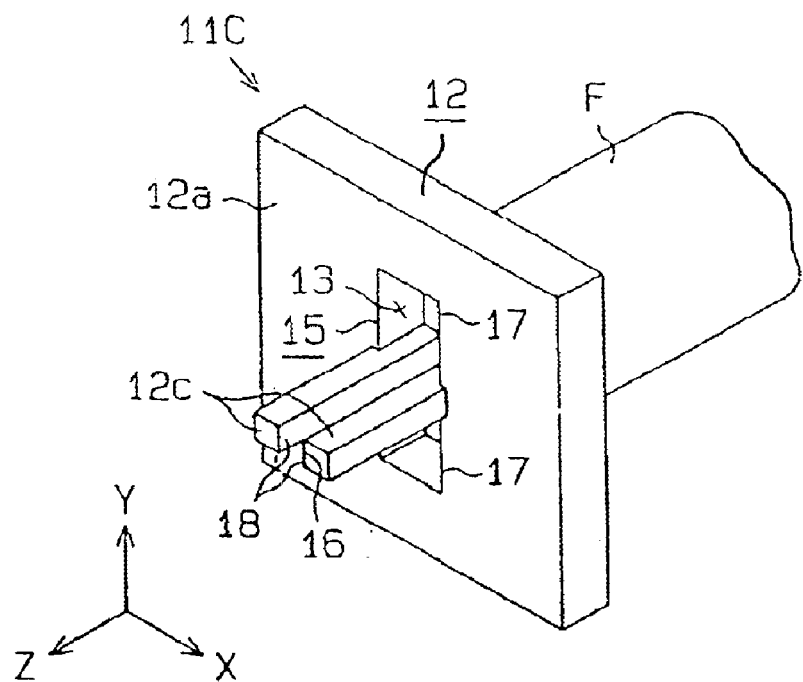
FIG. 14 is a perspective view illustrating an optical probe according to a fourth embodiment connected to an optical fiber.

As shown in FIG. 14, the optical waveguide device (optical probe) 11C of this embodiment includes a main body 12, which is a metal plate. As in the second embodiment, the main body 12 is made of silver (Ag). As in the previous embodiments, an optical waveguide 13 is formed in the main body 12 along the thickness direction. Thin pillar shaped projections 12c are formed on the front portion 12a. The projections 12c are formed by further extending step portions defining the narrow section 16 along the direction in which transmitted light is emitted from the minute opening 15. The widths and lengths of the narrow section 16 and the wide sections 17 in the optical waveguide 13 (and in the minute opening 15) are the same as those in the optical waveguide device 11A according to the second embodiment. The height of the projections 12c is 202 nm, which is the same as the height of the projection 12b of the second embodiment.

As in the previous embodiments, a predetermined light the wavelength of which is 488 nm is used. The predetermined light is a plane wave of linear polarization, and its polarization direction is the X direction as viewed in FIG. 14. When the predetermined light enters the optical waveguide 13 of the main body 12 through the optical fiber F, the phenomenon described below takes place. That is, as in the previous embodiments, surface plasmons are generated on the inner surface of the optical waveguide 13. The electric fields of the surface plasmons are coupled to each other. As a result, the electric field intensity is increased. Therefore, due to the coupling of the electric fields, the intensity of light transmitted through the optical waveguide 13 is increased. The transmitted light with the increased intensity emerges out of the minute opening 15 (specifically, out of a region between the peaks of the projection 12c) as a spotlight (near-field light).

As in the second and third embodiments, the divergence of the spotlight (near-field light) emerging out of the minute opening 15 is further less than that of the first embodiment. That is, the bright zone of the spotlight with an increased intensity and the twilight zone about the bright zone are both small. This is favorable for increasing a resolution and a data recording density in optical processing. The bright zone and the twilight zone are minimized for the same reasons as the case of the optical waveguide device 11A of the second embodiment. That is, the minute opening 15 does not lie along a plane perpendicular to the direction along which light is transmitted through the optical waveguide 13, but lies along a projected plane that includes the distal ends of the thin pillar shaped projections 12c. Detailed description of the operation has been given in the second embodiment and is omitted in this embodiment.

The optical waveguide device 11C according to the fourth embodiment has the same advantages as the advantages (1) to (5) of the optical waveguide device 11 according to the first embodiment, and the advantages (6) and (7) of the optical waveguide device 11A according to the second embodiment.

The above described embodiments may be modified as follows.

Figure 15A:
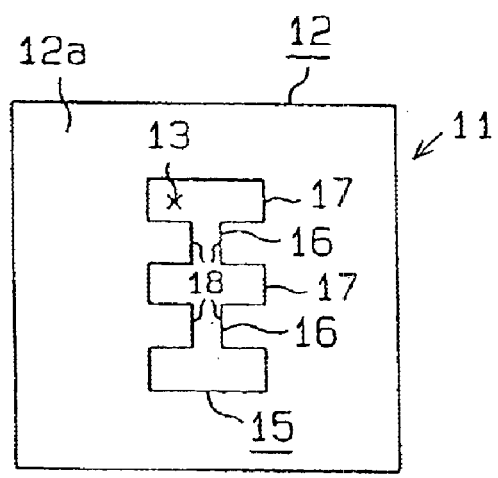
FIG. 15(a) is a front view illustrating a modification with a different shape of minute opening.

Each of the above illustrated embodiment has only one narrow section 16. However, as shown in FIG. 15(a), two narrow sections 16 and three wide sections 17 may be formed alternately to form an opening. This structure generates two spotlights with an increased light intensity. In short, as long as at least one narrow section 16 is formed adjacent to wide sections 17 in the minute opening 15, the number of the narrow section 16 may be more than one.

Figure 15B:
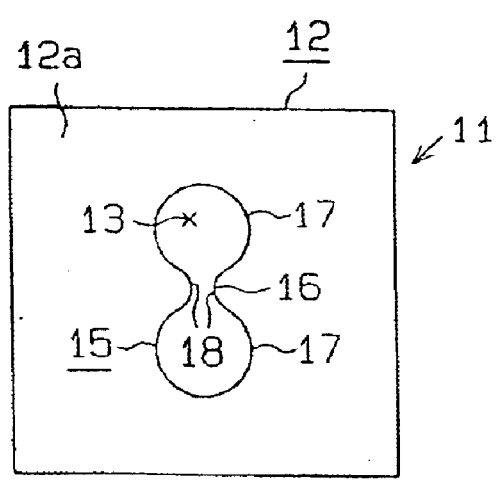
FIG. 15(b) is a front view illustrating a modification with a different shape of minute opening.

In each of the above illustrated embodiments, the minute opening 15 including the narrow section 16 and the wide sections 17 is formed with straight lines. However, the minute opening 15 may be formed with curved lines. For example, the minute opening 15 may be shaped like a dumbbell as shown in FIG. 15(b). Alternatively, the minute opening 15 may be formed with a combination of straight lines and curved lines.

In each of the above illustrated embodiments, the minute opening 15 is formed symmetrical. However, as long as the narrow section 16 and the wide sections 17 are arranged alternately, the shape of the opening 15 may be changed arbitrarily. For example, as shown in FIGS. 16(a), 16(b), and 16(c), as long as the narrow section 16 and the wide sections 17 are continuous in a direction intersecting the polarization direction of transmitted light (the width direction of the narrow section 16 in FIGS. 16(a) to 16(c)), the minute opening 15 may be asymmetrical. An excessively short length (represented by ay in FIG. 2) of the narrow section 16 not only mechanically weakens the minute opening 15, but also hinders surface plasmons from being generated on the parts 18 of the narrow section 16. However, if the minute opening 15 is formed such that the parts 18 of the narrow sections 16 are displaced along the length direction as shown in FIG. 16(c), the length of the parts 18 that are facing each other is reduced without causing the above mentioned mechanical weakness and the drawback regarding the generation of surface plasmons.

In each of the above illustrated embodiments, any cross-section of the optical waveguide 13 perpendicular to the light transmission direction is the same as the shape of the minute opening 15. However, the cross-section of the optical waveguide 13 varies in the light transmission direction. For example, as shown in FIGS. 17(a) and 17(b), a cross-section of the optical waveguide 13 may be larger in the main body 12 than the minute opening 15. If the polarization direction of light that enters through the back opening 14 is the Y direction (vertical direction) in FIG. 17(a), the narrow section 16 and the wide sections 17 may be continuous along the X direction (lateral direction).

In each of the above illustrated embodiments, the narrow section 16 is located at a center of the cross-section perpendicular to the light transmission direction of the optical waveguide 13. However, as shown in FIGS. 18(a) and 18(b), the narrow section 16 may be displaced from a center of the cross-section of the optical waveguide 13. Also, as long as the width of the narrow section 16 is less than the half of the wavelength of transmitted light, the ratio of the width of the wide sections 17 to the width of the narrow section 16 may be considerably greater than those in the above illustrated embodiments. That is, as long as the width of the wide sections 17 is greater than the width of the narrow section 16, the width of the wide sections 17 may be infinite.

In each of the above illustrated embodiments, the optical waveguide 13 extends through the main body 12. That is, the optical waveguide 13 is formed like a tunnel. However, as shown in FIGS. 19(a) to 20(b), the optical waveguide 13 may be formed like a groove formed in the surface of the main body 12. In the modification shown in FIGS. 19(a) and 19(b), a narrow section 16 is formed from the upper surface of the main body 12, and a wide section 17 is formed below and continuously to the narrow section 16. In the modification shown in FIGS. 20(a) and 20(b), a rectangular groove having a narrow section 16 is formed from the upper surface of the main body 12. The operating principle of the modification shown in FIGS. 20(a) and 20(b) is the same as that of the comparison example 1 shown in FIG. 6(b). Therefore, the distal opening of an optical waveguide according to the present invention includes not only the distal opening (the minute opening 15 shown in FIG. 1 and other drawings) of the optical waveguide 13 extending through the main body 12, but also the distal opening (the distal minute opening 15 shown in FIGS. 19(a) and 20(a)) of the optical waveguide 20, which opening is formed as a groove on one side of the main body 12.

Further as shown in FIGS. 21(a) and 21(b), a wide section 17, a narrow section 16, and a wide section. 17 may be formed by machining from the surface of the main body 12 in this order. In the modifications shown in FIGS. 19(a) to 20(b), the narrow section 16 of the optical waveguide 13 is located close to the surface of the main body 12. In this case, the intensity of transmitted light is maximized at a part close to the surface of the main body 12. To increase the packing density of an optical integrated circuit, a number of optical waveguides need to be arranged with narrow spaces in between. If groove like optical waveguides are formed in such an optical integrated circuit, short circuits may be established due to light emerging from the waveguides to the surface of the main body. In the structure of FIGS. 21(a) and 21(b), one of the wide sections 17 is exposed to the surface of the main body 12. Also, the narrow section 16, at which the light intensity is maximum, is away from the surface of main body 12. This structure is very advantages in preventing short circuits among the optical waveguides 13.

In each of the above illustrated embodiments, openings (the back opening 14 and the minute opening 15) are formed at both ends of the optical waveguide 13. However, only the minute opening 15 may be formed in the optical waveguide 13. That is, in the modification of FIGS. 17(a) and 17(b), the back opening 14 may be closed. In this case, light that enters the optical waveguide 13 through the minute opening 15 is reflected by the wall at the bottom and produces a standing wave. The light is then guided out of the minute opening 15. This structure is favorable for an illumination collection mode.

In each of the above illustrated embodiments, the narrow section 16 (and the inner parts 18) is formed along a straight line in the optical waveguide 13. The narrow section 16 permits surface plasmons to couple to each other, thereby increasing the electrical field intensity. The narrow section 16 also decreases the phase velocity of surface plasmons, thereby converging transmitted light. However, as shown by alternate long and short dashed lines in FIGS. 17(a), 17(b), and 18(b), the narrow section 16 (and the inner parts 18) may be branched in the optical waveguide 13. In this case, an additional distal opening like the minute opening 15 may be formed to correspond to the distal end of the branched narrow section 16. Further, the narrow section 16 may be branched not only into two parts, but also into three parts. Alternatively, the narrow section 16 may be branched into a number of parts at a number of locations.

This structure is highly practical when the optical waveguide 13 is used in an optical integrated circuit. That is, in an optical integrated circuit, optical waveguides must be routed (bent and branched) in a two-dimensional plane for forming a circuit with thin optical intensity distributions of nanometers. A circuit in which optical waveguides are routed in a two-dimensional plane parallel to an electric field is referred to as an E-plane circuit. A circuit in which optical waveguides are routed in a two-dimensional plane parallel to a magnetic field is referred to as an H-plane circuit.

In FIGS. 17(a) and 17(b), the narrow section 16 (and the inner parts 18) is branched. The electric field of the optical waveguide 13 chiefly lies along the Y direction, and the magnetic field chiefly lies along the X direction. Since the narrow section 16 is branched in a two-dimensional plane parallel to the magnetic field of the X direction, the optical waveguide 13 forms an H-plane circuit. In FIGS. 18(a) and 18(b), the narrow section 16 (and the inner parts 18) is branched. The electric field of the optical waveguide 13 chiefly lies along the X direction, and the magnetic field chiefly lies along the Y direction. Since the narrow section 16 is branched in a two-dimensional plane parallel to the electric field of the X direction, the optical waveguide 13 forms an E-plane circuit.

In the optical waveguide device 11 shown in FIGS. 17(a) and 17(b), an H-plane circuit is formed, and the parts of the narrow section 16 face each other along the Y direction. As long as the width of the narrow section 16 is less than the half of transmitted light, a superfine optical circuit along the branched narrow section 16 is formed even if the width of each wide section 17 is infinite along the Y direction. In the optical waveguide device 11 shown in FIGS. 18(a) and 18(b), an E-plane circuit is formed, and the parts of the narrow section 16 face each other along the X direction. As long as the width of the narrow section 16 is less than the half of transmitted light, a superfine optical circuit along the branched narrow section 16 is formed even if the width of each wide section 17 is infinite along the X direction.

Figure 22:
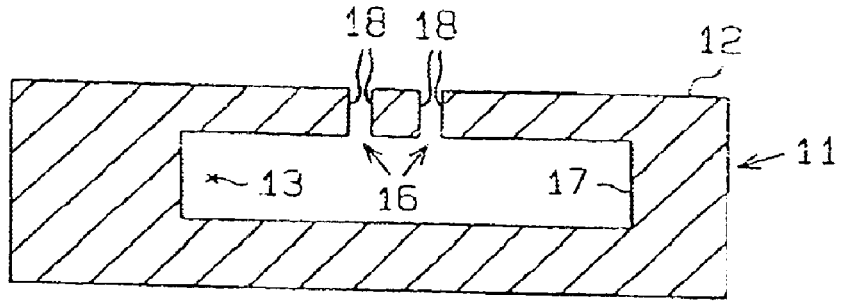
FIG. 22 is a cross-sectional view illustrating a modification in which an optical waveguide has a different cross section that intersects a light transmitting direction.
Figure 23:
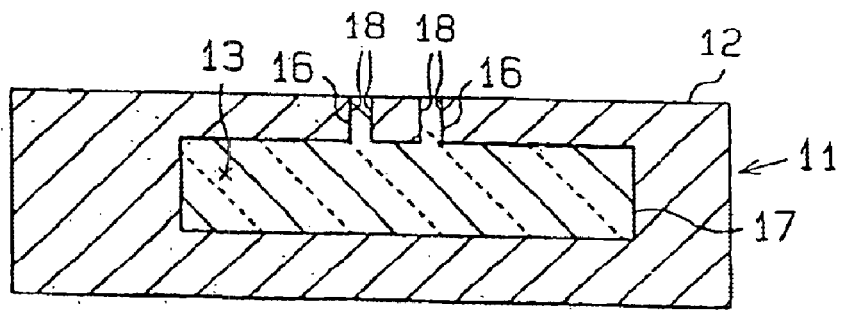
FIG. 23 is a cross-sectional view illustrating a modification in which an optical waveguide has a different cross section that intersects a light transmitting direction.
Figure 24:
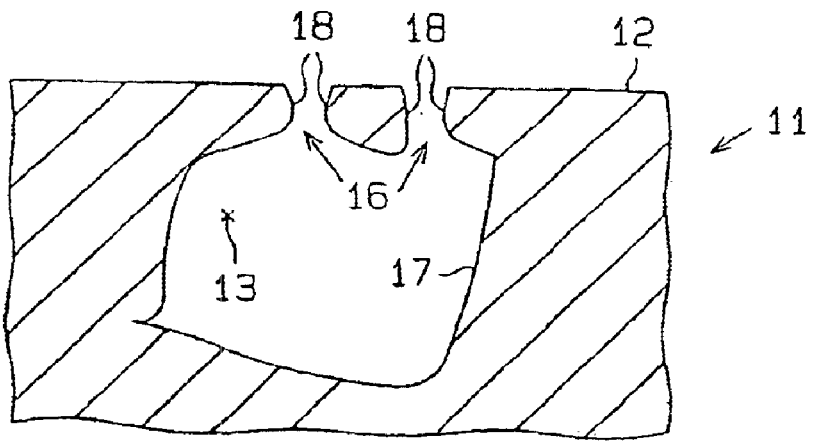
FIG. 24 is a cross-sectional view illustrating a modification in which an optical waveguide has a different cross section that intersects a light transmitting direction.

The embodiment shown in FIGS. 19(a) and 19(b) may be modified as shown in FIGS. 22 to 24. In the modification of FIG. 22, two narrow sections 16 are formed. The lower parts of the narrow sections 16 are connected to each other by a single wide section 17. The modification of FIGS. 23 is the same as the modification of FIG. 22 except for that the optical waveguide 13 is filled with a dielectric medium other than the outside (air). For example, the optical waveguide 13 is filled with glass. In the modification of FIG. 24, the cross-section of the optical waveguide 13 is formed with irregular curved lines. As in the modification FIG. 23, the optical waveguide 13 may be filled with a dielectric medium such as glass.

In each of the above illustrated embodiments, silver (Ag) in which the real part of the relative complex permittivity is minus 7.38 is used as a plasmon activating medium. As long as the real part of the relative complex permittivity is a minus value, other types of silver (Ag) may be used. As long as the real part of the relative complex permittivity is a minus value, gold (Au), platinum, an alloy of gold and platinum, other metal materials, or semiconductor materials may be used.

In each of the above illustrated embodiments, the entire main body 12 surrounding the optical waveguide 13 is made of a plasmon activating medium (silver Ag). However, as long as the inner parts 18 facing each other at the narrow section 16 is made of a plasmon activating medium (silver Ag), other parts may be made of materials other than a plasmon activating medium. Only the facing parts of the narrow section 16, which extends in the optical waveguide 13 from the distal opening (the minute opening 15) to the back opening 14, may be formed of a plasmon activating medium (silver Ag). A plasmon activating medium (silver Ag) may be evaporated onto the inner surface of the optical waveguide 13 including the parts 18 of the narrow section 16.

In each of the above illustrated embodiments, the width aX of the narrow section 16 of the minute opening 15 is set to a predetermined value (for example, 31 nm). As long as the width aX is less than the half of the wavelength of transmitted light, the width aX may be changed. Also., the measurement L along the Y direction, which intersects the width direction (X direction) of the minute opening 15 may be changed from the ones presented above. That is, as long as the measurement L is greater than the measurement calculation value, the measurement L may be greater than the half of the wavelength of transmitted light.

In each of the above illustrated embodiments, the cross-section of the optical waveguide 13 perpendicular to the light transmission direction is the same as the minute opening 15 and is constant towards the back opening 14. However, the shape of the optical waveguide 13 may be changed. For example, the optical waveguide 13 may be tapered such that the area of the cross-section decreases from the back opening 14 to the distal minute opening 15.

In each of the above illustrated embodiments, a medium that forms the interfaces S with the inner surface of the optical waveguide 13 is air. However, as suggested in the modification of FIG. 23, the optical waveguide 13 may be filled with a dielectric medium such as glass.

In each of the above illustrated embodiments, the narrow section 16 is formed along the entire inner surface of the optical waveguide 13. However, the narrow section 16 may be formed only at the minute opening 15, which is the distal opening of the optical waveguide 13. Instead of the minute opening 15, a part similar to the minute opening 15 having the narrow section 16 and the wide sections 17, which are formed continuously, may be provided midway in the light transmission direction of the optical waveguide 13. In this case, the distal opening and the back opening (back side) are wider than the wavelength of transmitted light.

In the second and third embodiments, the projection 12b is conical. However, as long as the projection 12b is shaped like a pyramid. In the: fourth embodiment, each projection 12c is shaped like a thin pillar of a rectangular cross-section. However, as long as a narrow section is defined between the pillars, the each projection 12c may have a semicircular cross-section or a thin extended rectangular cross-section.

An optical waveguide device 41 according to a fifth embodiment will now be described with reference to FIGS. 25 to 28. In this embodiments the optical waveguide device 41 is an exposure mask (including a reticle). An exposure mask is used in a projection exposure system, which is referred to as stepper. Specifically, an exposure mask is used when a circuit pattern is formed on a semiconductor substrate, on which sensitive material is applied, through lithography, or through projection and exposure.

Figure 25:
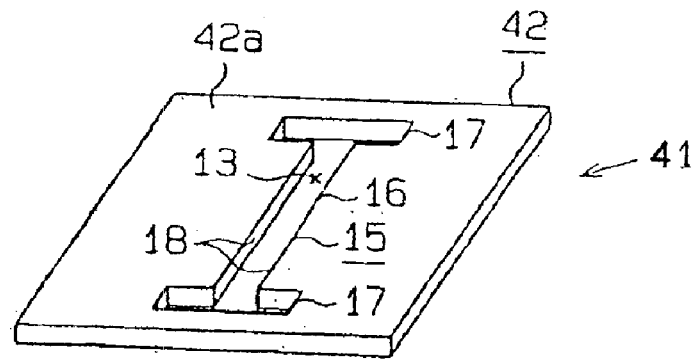
FIG. 25 is a perspective view illustrating a fifth embodiment, in which the present invention is applied to an exposure mask.

As shown in FIG. 25, the optical waveguide device (exposure mask) 41 of this embodiment includes a main body 42, which is a rectangular metal plate. As in the above illustrated embodiments, the main body 12 is made of silver (Ag). An optical waveguide 13 is formed in the main body 42 along the thickness direction. A minute opening 15 is formed on a front portion 42a and a back portion (not shown) of the main body 42. The minute opening 15 functions as end openings (a distal opening and a proximal opening). The width of the minute opening 15 is less than the wavelength of light. The minute opening 15 has a narrow section 16 and a pair of wide sections 17, which are arranged alternately. The narrow section 16 is substantially located in a center of the front portion 42a. As in the first embodiment, the width of each of the narrow section 16 and the wide sections 17 is defined as the measurement along the polarization direction of light transmitted through the optical waveguide 13, or the measurement along the lateral direction as viewed in FIG. 25. The narrow section 16 and the wide sections 17 are continuously formed along a direction perpendicular to the width direction. Although the actual size of the minute opening 15 is significantly small compared to the size of the main body 42 (and the front portion 42a), the size of the minute opening 15 is exaggerated in FIG. 25 and other drawings, so that the unique shape of the minute opening 15 is easily recognized.

In this embodiment, the width of the narrow section 16 is 16 nm, and the width of each wide section 17 is 47 nm. The length of the narrow section 16 is 280 nm, and the length of each wide section 17 is 93 nm. The thickness of the main body 42 is 78 nm. Therefore, the length of the minute opening 15 is 466 nm.

An operation of the optical waveguide device 41 of this embodiment will now be described.

Figure 26:
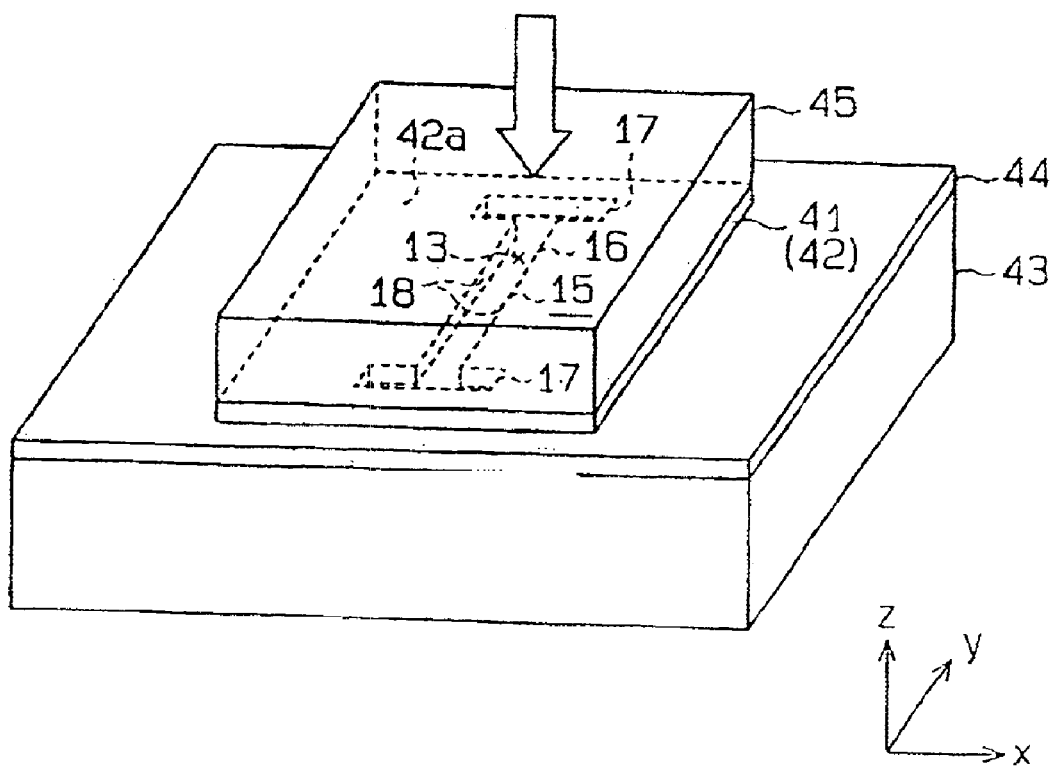
FIG. 26 is a perspective view showing the exposure mask of FIG. 25 in use.

When a circuit patter is formed through projection and exposure using the optical waveguide device 41, which is an exposure mask, the main body 42 of the device 41 is placed on a semiconductor substrate 43 as shown in FIG. 26. A sensitive material such as novolac resin is applied to the surface of the semiconductor substrate 43 in advance to form a sensitive material layer 44. The main body 42 closely contacts the sensitive material layer 44. Then, a transparent glass plate 45 is placed on the main body 42, and projection light is irradiated from above. That is, as in the above illustrated embodiments, light the wavelength of which is 488 nm is used. The light is a plane wave of linear polarization, and its polarization direction is the lateral direction as viewed in FIG. 26. The light enters the optical waveguide 13 of the main body 42 as a projection light. At this time, the following phenomenon takes place in the optical waveguide 13 of the optical waveguide device 41.

That is, as in the previous embodiments, surface plasmons are generated on the inner surface of the optical waveguide 13. The electric fields of the surface plasmons are coupled to each other. As a result, the electric field intensity is increased between the interfaces of the narrow section 16.

Therefore, due to the coupling of the electric fields, the intensity of light transmitted through the optical waveguide 13 is increased. The transmitted light with the increased intensity em emerges out of the narrow section 16 of the minute opening 15 as a thin line spotlight (near-field light) along the longitudinal narrow section 16. The, the sensitive material layer 44 on the semiconductor substrate 43 is exposed to the thin line spotlight. Thereafter, unnecessary part of the sensitive material layer 44 is removed through a conventional etching. Accordingly, a circuit pattern is formed on the semiconductor substrate 43. A linear part of a wiring pattern of the circuit pattern corresponds to the thin line spot light.

Figure 27A:
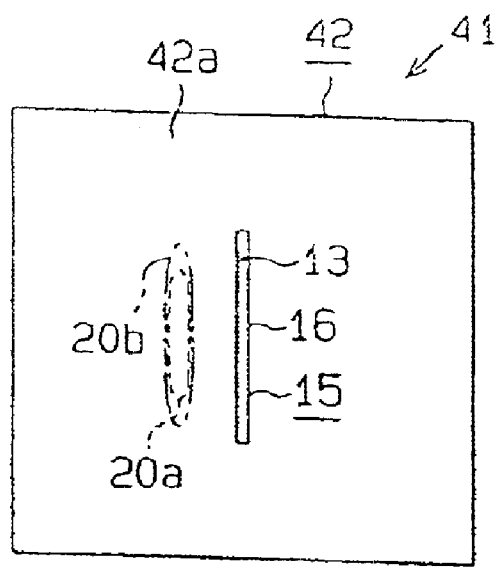
FIG. 27(a) is a front view showing a comparison example.
Figure 27B:
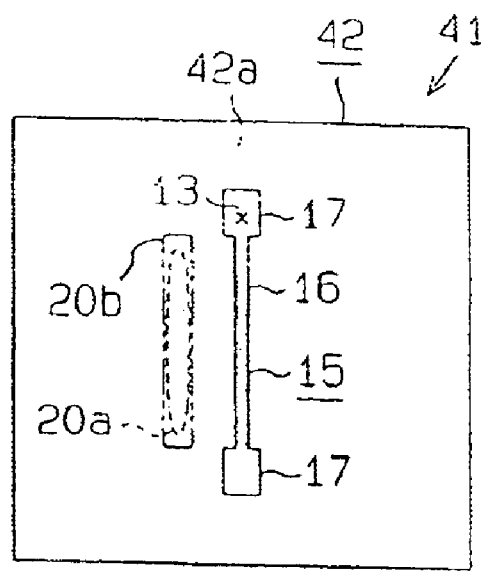
FIG. 27(b) is a front view showing a comparison example.
Figure 27C:
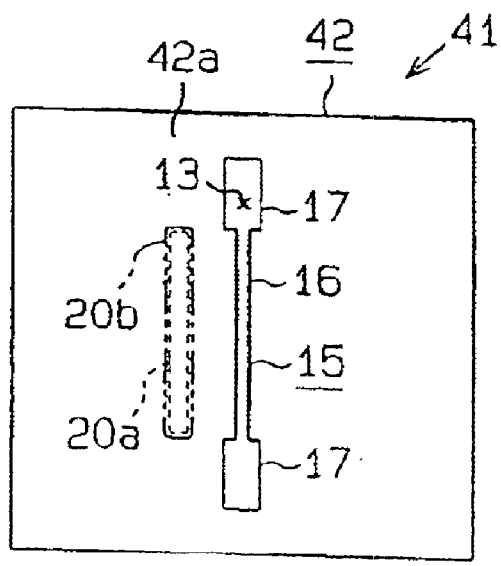
FIG. 27(c) is a front view showing the fifth embodiment.
Figure 27D:
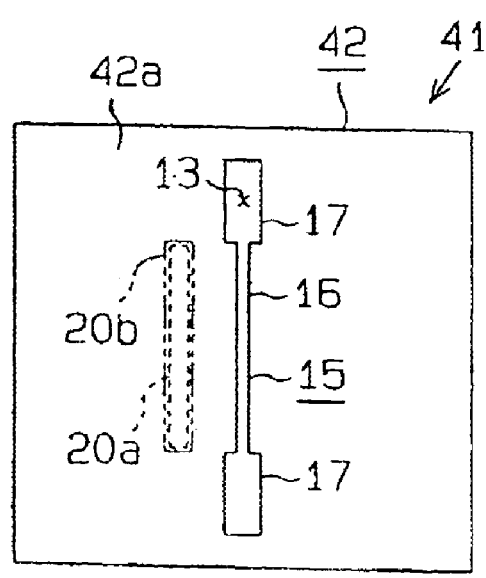
FIG. 27(d) is a front view showing a comparison example.

In this embodiment, due the difference between a cross-section of the optical waveguide 13 along the light transmission direction and a cross-section perpendicular to the light transmission direction (and the shape of the minute opening 15), the diversion (the distribution of light intensity) of the thin line spotlight (near-field light) emerging out of the minute opening 15 varies. This point will now be described with reference to FIGS. 27(a) to 28(b). FIG. 27(a)

is a front view of an optical waveguide device 41 having an optical waveguide 13 (and a minute opening 15) the cross-section of which perpendicular to a light transmission direction of a main body 42 consists only of a narrow section 16 and is an extended rectangle. FIGS. 27(b) and 27(d) are front views of optical: waveguide devices 41 each having an optical waveguide 13, in which a narrow section 16 and wide sections 17 are continuously formed. FIG. 27(c) is front view of an optical waveguide device 41 according to this embodiment, which has the optical waveguide 13 and the minute opening 15 of the above described measurements.

The width of the minute opening 15, or the width of the optical waveguide 13 of the of the optical waveguide device 41 shown in FIG. 27(a), is 16 nm, which is the same as the width of the narrow section 16 of the minute opening 15 according to the fifth embodiment. The length of the minute opening 15 (and the narrow section 16), or the longitudinal measurement of the minute opening 15, is 280 nm, which is the same as the measurement of the narrow section 16 of this embodiment. The minute opening 15 of the optical waveguide 13 in the optical waveguide device 41 shown in FIG. 27(b) is the same as that of this embodiment except for that the length of each wide section is less than that of this embodiment (93 nm), for example, 62 nm. The minute opening 15 of the optical waveguide 13 in the optical waveguide device 41 shown in FIG. 27(d) is the same as that of this embodiment except for that the length of each wide section is more than that of this embodiment (93 nm), for example, 109 nm. As in FIGS. 11(a) and 11(b) of the second embodiment, a bright zone 20a of each spotlight and a twilight zone 20b of the peripheral light are is shown by broken lines and two-dot chain lines to the left of each minute opening 15 in FIGS. 27(a) through 27(d).

Figure 28A:
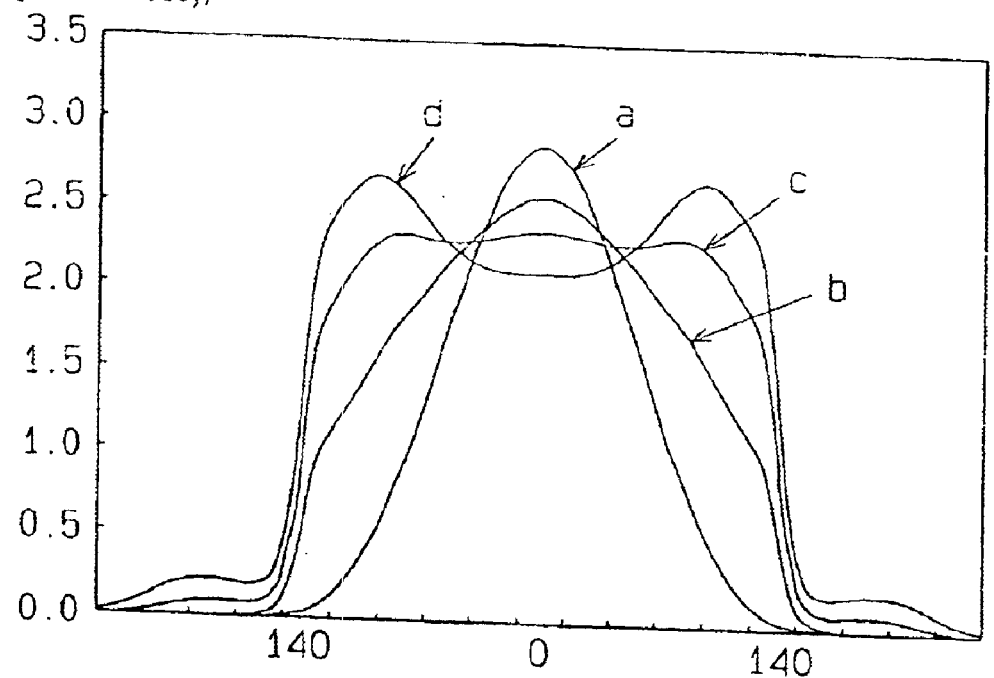
FIGS. 28(a) and 28(b) are graphs showing light intensity distribution on an imaginary plane along a vertical direction (internal longitudinal direction) of light that has passed through minute openings of FIGS. 27(a) to 27(d)
Figure 28B:
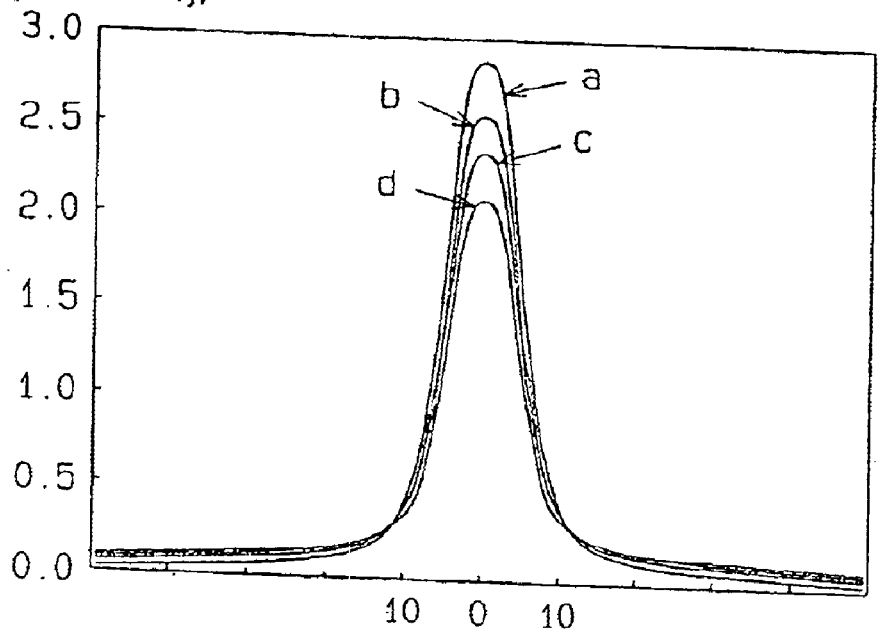

FIG. 28(a) shows the intensity distribution of light along a vertical imaginary plane containing the center of the minute opening 15 in each of FIGS. 27(a) to 27(d), when a light passes through the optical waveguide 13 of the optical waveguide device 41 shown in each of FIGS. 27(a) to 27(d) under the same conditions. Likewise, FIG. 28(b) shows the intensity distribution of light along a lateral imaginary plane containing the center of the minute opening 15 in each of FIGS. 27(a) to 27(d). In FIGS. 28(a) and 28(b), curves a represent light intensity distributions of the light that has passed through the minute opening 15 shown in FIG. 27(a), and curves b represent light intensity distributions of the light that has passed through the minute opening 15 shown in FIG. 27(b). Likewise, curves c represent light intensity distributions of the light that has passed through the minute opening 15 shown in FIG. 27(c), and curves d represent light intensity distributions of the light that has passed through the minute opening 15 shown in FIG. 27(d).

In the optical waveguide device 41 of FIG. 27(a), the light intensity is high at in a range including the center of the minute opening 15. However, the bright zone 20a is not expanded to the longitudinal ends of the minute opening 15. The ends are in twilight zones 20b and light intensity is low. In the optical waveguide device 41, the bright zone 20a expands to the longitudinal ends of the-minute opening 15. However, the light intensity varies significantly along the entire length of the minute opening 15. In the optical waveguide device 41 of FIG. 27(d), the light intensity is maximum at the longitudinal ends of the minute opening 15, and is less at the center. These optical waveguide devices 41 are not suitable for exposure masks.

In contrast to the optical waveguide devices of FIGS. 27(a), (b), and (d), the light intensity of the optical waveguide device 41 shown in FIG. 27(c) is relatively high and scarcely varies along the entire length of the narrow section of the narrow section 16 of the minute opening 15. That is, in accordance with the measurements of the narrow section 16, a spotlight with an even light intensity is obtained. The width and the length of the spotlight is 16 nm and 280 nm, respectively. FIGS. 28(a) and 28(b) show cases where the light intensity of the incident light is represented by 1.0. As shown in FIGS. 28(a) and 28(b), the intensity of the emitted light is 2.3 times the intensity of incident light.

Accordingly, in addition to the advantages (1) to (5) of the optical waveguide device 11 of the first embodiment, the optical waveguide device 41 of this embodiment has the following advantages.

These days, technology for forming fine circuit patterns on the semiconductor substrate 43 with electron guns of excimer laser has been proposed. However, to reliably form fine line patterns, the technology of excimer laser still has technical challenges to overcome and is costly. In contrast to this, if the optical waveguide device 41 is used as an exposure mask, a conventional projection exposure system (stepper) can be used, which permits fine linear circuit patterns to be formed through lithography at a low cost.

The optical waveguide device 41 according to the fifth embodiment may be modified as follows.

The cross-section of the optical waveguide 13 perpendicular to the light transmission direction and the minute opening 15 may be shaped like a letter L when viewed from front. That is, the optical waveguide 13 and the minute opening 15 may have two narrow sections 16 that are connected to each other at the ends and form a right angle. This permits a perpendicular part of a circuit pattern to be easily formed. In this case, wide sections are preferably formed in the vicinity of the perpendicular joint between the narrow sections 16. This point will be discussed below.

Figure 29:
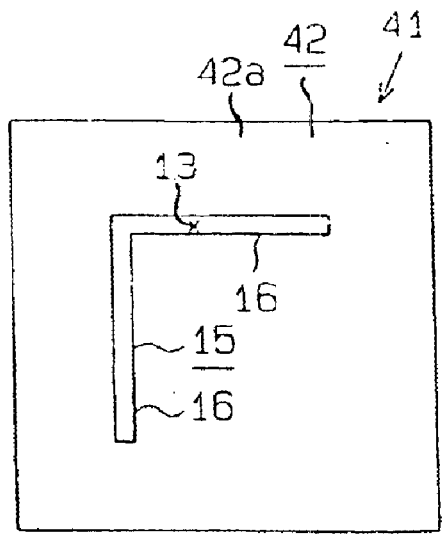
FIG. 29(a) is a front view illustrating a modification of the fifth embodiment.
FIG. 29(b) is a diagrammatic view for explaining the light intensity distribution of the modification of FIG. 29(a)
Figure 29:
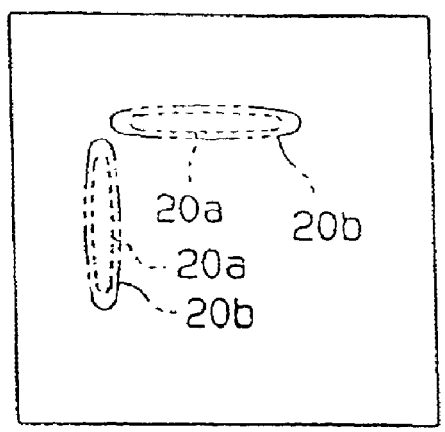

In the case of an optical waveguide device 41 shown in FIG. 29(a), the minute opening 15 of the optical waveguide 13 is L-shaped. Narrow sections 16 are connected to each other to form a right angle. No wide section 17 is formed in the minute opening 15. FIG. 29(b) shows the distribution of spotlight emerging out of the minute opening of FIG. 29(a). As shown in FIG. 29(b), bright zones 20a as well as twilight zones 20b, are not connected to each other. Therefore, the optical waveguide device 41 of FIG. 29(a) cannot be used for forming perpendicular parts in a circuit pattern.

Figure 30:
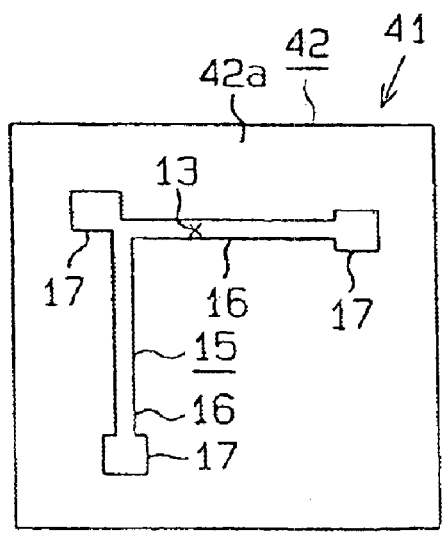
FIG. 30(a) is a front view illustrating a modification of the fifth embodiment.
FIG. 30(b) is a diagrammatic view for explaining the light intensity distribution of the modification of FIG. 30(a)
Figure 30:
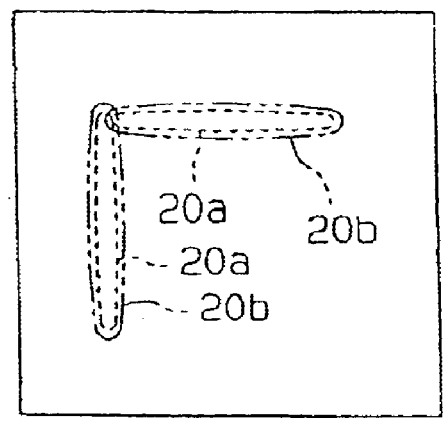

In the case of an optical waveguide device 41 shown in FIG. 30(a), the minute opening 15 of the optical waveguide 13 is L-shaped. Narrow sections 16 are connected to each other to form a right angle. Also, a wide section 17 is formed at the end of each narrow section 16. Also, a wide section 17 is formed at the joint of the narrow sections 16, where the narrow sections 16 intersect perpendicularly. Therefore, when a horizontally polarized wave the polarization direction of which is the lateral direction in FIG. 30(a) and a vertically polarized wave the polarization direction of which is the vertical direction in FIG. 30(a) enter the optical waveguide 13 of the optical wave guide device 41, bright zones 20a and twilight zones 20b shown in FIG. 30(b) are produced. That is, in accordance with the widths and the lengths of the narrow sections 16, linear spotlights with an even light intensity are obtained. The spotlights form a letter L.

An optical waveguide device 51 according to a sixth embodiment will now be described with reference to FIGS. 31 and 32. In this embodiment, the optical waveguide device 51 is a polarizer. A polarizer is a device for obtaining a polarized light in a predetermined direction from a light containing polarized lights in all directions, such as natural light. A polarizer is also used for checking if there is any polarized light. For example, a polarizer is used as a spectroscope for disintegrating into spectrums.

Figure 31:
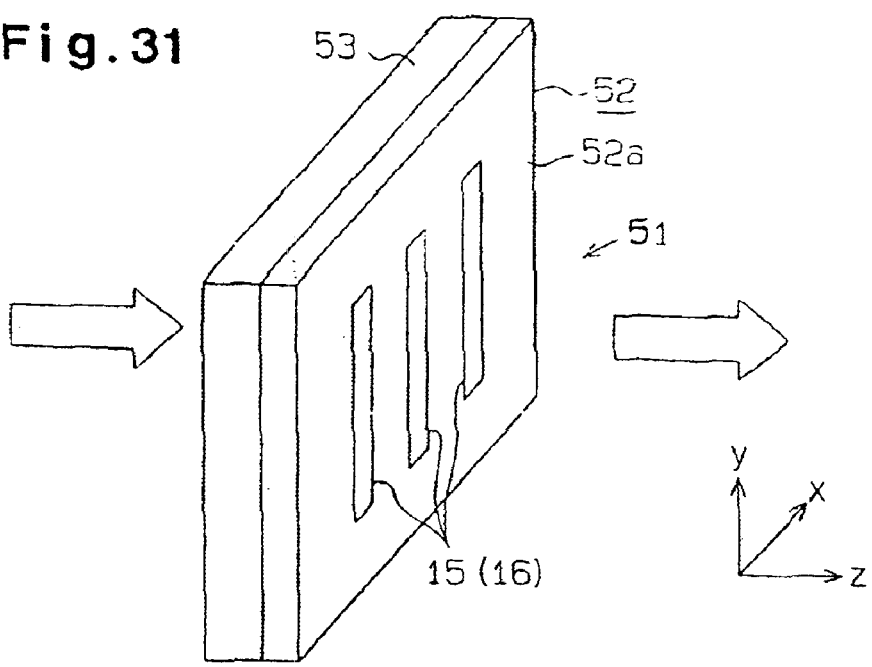
FIG. 31 is a perspective view illustrating a sixth embodiment, in which the present invention is applied to a polarizer.

As shown in FIG. 31, the optical waveguide device (polarizer) 51 of this embodiment includes a main body 52, which is a rectangular metal plate. As in the above illustrated embodiments, the main body 12 is made of silver (Ag). Optical waveguides 13 are formed in the main body 52 along the thickness direction. In this embodiment, the number of the optical waveguide 13 is three. Minute openings 15 are formed on a front portion 42a and a back portion (not shown) of the main body 52. The minute openings 15 function as end openings (distal openings and proximal openings). The width of each minute opening 15 is less than the wavelength of light.

Like the optical waveguide device 11B according to the third embodiment, each minute opening 15 according to the sixth embodiment is formed like an extended rectangle. That is, each minute opening 15 has no wide sections, and its width is constant long the entire length. In other words, the minute opening 15 is a linear slit. The minute openings 15 each forming a narrow section 16 are arranged parallel to each other. The width of each minute opening 15 is defined as the measurement along the polarization direction of light transmitted through the corresponding optical waveguide 13, or the measurement along an X direction as viewed in FIG. 31. Each minute opening 15 is formed as a rectangle extended along a direction perpendicular to the width direction, or along the Y direction as viewed in FIG. 31. Although the actual size of each minute opening 15 is significantly small compared to the size of the main body 52 (and the front portion 52a), the size of the minute opening 15 is exaggerated in FIG. 31.

In this embodiment, the width of each minute opening 15, which is also the narrow section 16, is 16 nm. The length of each minute opening 15 (and each narrow section 16), which is also the measurement of the minute opening 15, is, for example, 559 nm. The thickness of the main body 52 is, for example, 78 nm. The interval between each adjacent pair of the minute openings 15 is 62 nm. As shown in FIG. 31, a glass substrate 53 is fixed to a back of the main body 52, or to a side opposite from the front portion 52a.

An operation of the optical waveguide device 51 (polarizer) of this embodiment will now be described.

Suppose that light represented by arrows in FIG. 31 enters the optical waveguides 13 from the back (the glass substrate 53) of the optical waveguide device 51, and the wavelength of the light is 488 nm. A light component in the incident light that is polarized in the X direction passes through the optical waveguides 13 and is emitted from the minute openings 15 in the Z direction as a transmitted light. However, a light component that is polarized in the Y direction in FIG. 31 is not transmitted and emitted. Therefore, light the polarization direction is perpendicular to the longitudinal direction of the minute openings 15 (the Y direction in FIG. 31) passes through and is emitted from the device 51.

The area of the optical waveguides 13 (and the minute openings 15) of the optical waveguide device (polarizer) 51 is extremely small compared to the entire area of the front portion 52a of the main body 52. However, as in the cases of the optical waveguide devices 11, 11A, 11B, 11C, and 41, the main body 52 is made of a dielectric medium (plasmon activating medium) whose real part of the relative complex permittivity is negative, or silver (Ag), in which the real part of the relative complex permittivity is minus 7.38 when the wavelength of transmitted light is 488 nm in this embodiment.

Therefore, due to the coupling of the electric fields of surface plasmons, the electric field intensity of a light component polarized in the X direction in the light entering the optical waveguide 13 (the angle of the light component defined by the incident polarization plane (in FIG. 31) and the X axis is zero degrees) is increased. The light component with the increased intensity is emitted as transmitted light. The reason for this is that, as in the above illustrated embodiments, the electric fields of surface plasmons produced at the inner surfaces of each optical waveguide 13 are coupled to each other at the interfaces in the width direction. The light that enters each optical waveguide 13 includes light components. The angle defined by the incident polarization plane and the X axis is not zero degrees for some of the light components. Among the light components with angles other than zero degrees, light components with a small angle is slightly emitted from the minute opening 15 of the optical waveguide 13. This phenomenon will now be described with reference to FIG. 32.

Figure 32:
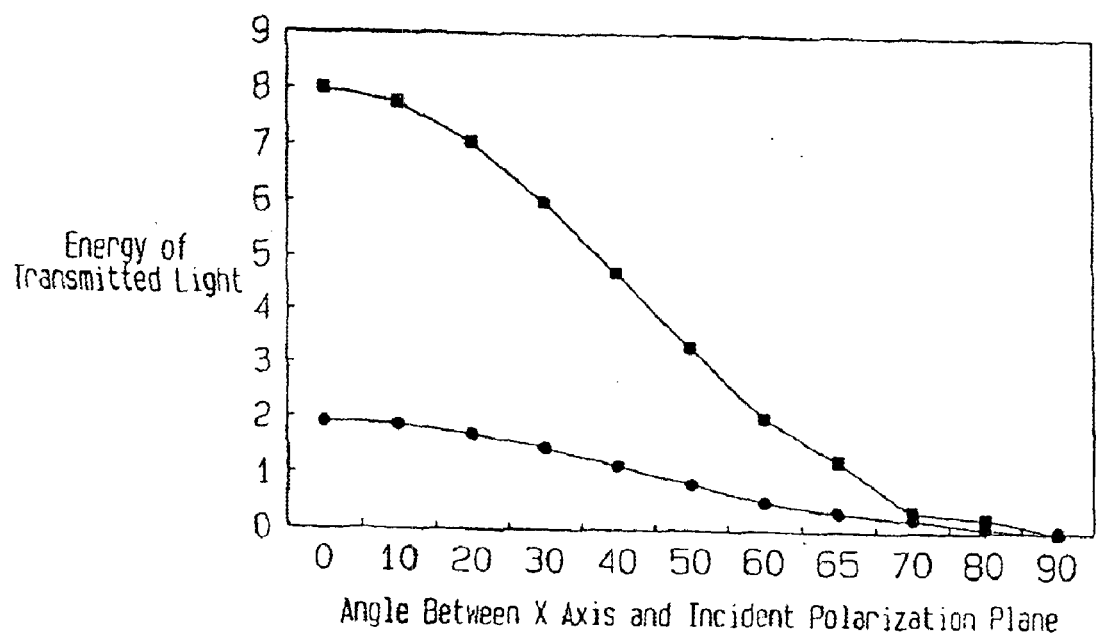
FIG. 32 is a graph showing the relationship between the energy of transmitted light and the angle of incident polarizing plane of the optical waveguide device according to the six embodiment.

In FIG. 32, the horizontal axis represents the angle defined by the X axis of FIG. 31 and the incident polarization plane of light (polarized light) that enters each optical waveguide 13. If the angle of a light is ninety degrees, the polarization direction of the light is the Y direction in FIG. 31. If the angle of a light is zero degrees, the polarization direction of the light is the X direction in FIG. 31. In FIG. 32, the vertical axis represents the energy of transmitted light through each optical waveguide 13 (and the minute opening 15). Specifically, the energy of incident light in a unit area of each optical waveguide 13 is defined as one, and the energy of the transmitted light is measured based on this value. In FIG. 32, black circular spots represent the results of a simulation performed on the assumption that there is only one optical waveguide 13, and the width and the length of the waveguide 13 is 16 nm And 559 nm, respectively. Black square spots represents the results of a simulation performed on the assumption that there are two parallel optical waveguides 13 of the same measurements as the first simulation.

As obvious from FIG. 32, the energy of transmitted light is greater when the angle defined by the incident polarization plane and the X axis is closer to zero degrees. This tendency is stronger in the case of the black square spots, where the two parallel optical waveguides 13 are provided, compared to the case of the black circular spots, where only one optical waveguide 13 is provided. In the above simulations, energy is measured with a unit area that is defined according to the wave number ($2\Pi$/wavelength). Specifically, the energy in a unit area of a square each side of which is 78 nm (78 nm×78 nm square) is defined as one. This is based on the fact that the equation ($78\times(2\Pi/488)=1$) is satisfied when each side of the square is defined based on the wave number. In this case, the energy of the incident light in the optical waveguide device 51 of the simulation represented by black circular spots in FIG. 32 was 1.44. In this case, the energy of transmitted light from the minute opening 15 of the optical waveguide 13 was 1.89.

Apparently, these results contract the law of conservation of energy. However, the results are due to the fact that the electric fields of surface plasmons produced on the inner surfaces of the optical waveguides 13 having a linear opening are coupled to each other, and thus the energy of incident light that passes through an optical waveguide having a greater cross-sectional area than the optical waveguide 13 is converged. To obtain the polarization characteristics of the optical waveguide device (polarizer) 51 having the optical waveguide 13 with the cross-section shown above, a conventional extinction ratio ψ was computed. The extinction ratio ψ was computed by an equation ψ=P1/P2≈10 Log×(900). The result was 30(dB).

In the equation for computing the extinction ratio ψ, P1 represents the energy of a transmitted light when the angle defined by the incident polarization plane and the X axis is zero degrees. P2 represents the energy of a transmitted light when the angle defined by the incident polarization plane and the X axis is ninety degrees. Likewise, in the case of the optical waveguide device 51 of the simulation results represented by black square spots, the incident energy was 2.88, and the energy of the transmitted energy was 8.00. The extinction ratio ψ was substantially equal to 32 (dB) (ψ≈10 Log (1625)=32(dB)).

Accordingly, in addition to the advantages (1) to (5) of the optical waveguide device 11 of the first embodiment, the optical waveguide device 51 (the polarizer) of this embodiment has the following advantages.

That is, the sixth embodiment simplifies the structure of the polarizer (polarizing plates) used in a spectroscope and thus reduces the cost. Also, the sixth embodiment permits the intensity of a polarized light component to be increased so that light with an increased intensity is emitted.

The optical waveguide device 51 according to the sixth embodiment may be modified as follows.

The number of the optical waveguides 13 is arbitrarily changed as long as there are one or more waveguides 13. As long as the minute openings 15 (narrow sections 16) of the optical waveguides 13 are parallel, the minute openings 15 need not extend along the X direction in FIG. 31. That is, referring to FIG. 32, as long as a desired amount of energy of transmitted light is obtained, each minute opening 15 may extend in a direction that intersects the X direction at a predetermined angle.

The present examples and embodiments are to be considered as illustrative and not restrictive and the invention is not to be limited to the details given herein, but may be modified within the scope and equivalence of the appended claims.

What is claimed is:

1. An optical waveguide device, comprising:
   an optical waveguide for transmitting light having a predetermined wavelength along a first direction that is perpendicular to second and third directions, the second and third directions being perpendicular to each other; and
   defining surfaces defining the optical waveguide, wherein the defining surfaces include a pair facing parts that face each other along the second direction, wherein the distance between the facing parts is less than the half of the wavelength of the light transmitted through the optical waveguide, and wherein, among the defining surfaces, at least the facing parts are made of plasmon activating medium.

2. The optical waveguide device according to claim 1, wherein the optical waveguide has an outlet for light transmitted through the optical waveguide, and wherein the facing parts are provided at least at portions of the defining surfaces that correspond to the outlet.

3. The optical waveguide device according to claim 2, wherein a cross-section of the optical waveguide along an arbitrary plane that is perpendicular to the first direction is the same as the shape of the outlet.

4. The optical waveguide device according to claim 3, wherein the optical waveguide is one of a plurality of optical waveguides, and wherein the outlets of the optical waveguides are linear slits that extend parallel to each other.

5. The optical waveguide device according to claim 2, further comprising a projection in which the outlet is opened, the projection projecting in a direction along which light is transmitted through the optical waveguide, and wherein at least portions of the facing parts are located at portions of the defining surfaces that correspond to portions of the outlet that project most in the direction along which light is transmitted.

6. The optical waveguide device according to claim 1, wherein the distance between the facing parts is less than two fifths of the wavelength of the light transmitted through the optical waveguide.

7. The optical waveguide device according to claim 6, wherein the distance between the facing parts is less than three tenths of the wavelength of the light transmitted through the optical waveguide.

8. The optical waveguide device according to claim 7, wherein the distance between the facing parts is less than one fifth of the wavelength of the light transmitted through the optical waveguide.

9. The optical waveguide device according to claim 8, wherein the distance between the facing parts is less than one tenth of the wavelength of the light transmitted through the optical waveguide.

10. The optical waveguide device according to claim 1, wherein each of the facing parts is a first facing part, and wherein the defining surfaces further include a pair of second facing parts that face each other along the second direction, and wherein the distance between the second facing parts is more than the distance between the first facing parts.

11. The optical waveguide device according to claim 10, wherein the second facing parts are continuously formed with the first facing parts with respect to the third direction.

12. The optical waveguide device according to claim 11, wherein the first facing parts are a pair of a plurality of pairs of first facing parts, and wherein the first facing parts and the second facing parts are alternately and continuously arranged with respect to the third direction.

13. The optical waveguide device according to claim 1, wherein a measurement of a cross-section of the optical waveguide along a plane that is perpendicular to the first direction and crosses the facing parts is more than a predetermined value with respect to the third direction, and wherein the predetermined value is computed by dividing the phase velocity of surface plasmons generated on the facing parts when the optical waveguide transmits light by the speed of the light in a vacuum, and then multiplying the division result by the half of the wavelength of the light.

14. The optical waveguide device according to claim 1, wherein the plasmon activating medium is a dielectric medium having a negative value for the real part of the relative complex permittivity.

* * * * *